US012287021B2

(12) United States Patent
Ferguson, Jr. et al.

(10) Patent No.: US 12,287,021 B2
(45) Date of Patent: Apr. 29, 2025

(54) MODULAR INTEGRATION KIT FOR A POSITIONING SYSTEM

(71) Applicant: MSI Defense Solutions, LLC, Mooresville, NC (US)

(72) Inventors: William Donald Ferguson, Jr., Charlotte, NC (US); David John Holden, Davidson, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 901 days.

(21) Appl. No.: 17/372,234

(22) Filed: Jul. 9, 2021

(65) Prior Publication Data

US 2022/0011070 A1 Jan. 13, 2022

Related U.S. Application Data

(60) Provisional application No. 63/050,060, filed on Jul. 9, 2020.

(51) Int. Cl.
*F41A 23/24* (2006.01)
*F16F 15/08* (2006.01)

(52) U.S. Cl.
CPC .............. *F16F 15/08* (2013.01); *F41A 23/24* (2013.01)

(58) Field of Classification Search
None
See application file for complete search history.

(56) References Cited

U.S. PATENT DOCUMENTS

| 344,218 A | * | 6/1886 | Tardy | F41H 5/013 |
| | | | | 112/153 |
| 1,273,178 A | * | 7/1918 | Name not available | |
| | | | | F41A 23/38 |
| | | | | 89/37.03 |
| 1,568,089 A | * | 1/1926 | Russell | F41A 23/00 |
| | | | | 89/40.01 |
| 2,148,515 A | | 2/1939 | Taylor | |

(Continued)

FOREIGN PATENT DOCUMENTS

CN 105757164 * 10/2016 .............. F46B 43/00

OTHER PUBLICATIONS

International Search Report dated Oct. 20, 2021 issued in corresponding International Application No. PCTUS2021/41151.

*Primary Examiner* — Derrick R Morgan
(74) *Attorney, Agent, or Firm* — Jeffrey C. Watson, Esq.; Grell & Watson Patent Attorneys LLC

(57) ABSTRACT

A modular integration kit for a positioning system, like a positioning system on a vehicle, includes a configurable foundation plate, a dampened bolting structure, and a modular vibration isolation assembly. The configurable foundation plate is configured to attach to the positioning system. The dampened bolting structure is affixed to the configurable foundation plate. The dampened bolting structure is configured to attach a payload to the positioning system, like for attaching a payload of a rifle, an optic and/or a rocket launcher onto a positioning system of a vehicle. The modular vibration isolation assembly is arranged between the configurable foundation plate and the dampened bolting structure. The modular vibration isolation assembly is configured to dampen the dampened bolting structure from movements of the configurable foundation plate attached to the positioning system.

16 Claims, 16 Drawing Sheets

(56) References Cited

U.S. PATENT DOCUMENTS

| | | | | |
|---|---|---|---|---|
| 2,364,425 A * | 12/1944 | Corte | F41A 27/18 | |
| | | | 89/37.17 | |
| 2,370,896 A * | 3/1945 | Weaver | F41A 27/16 | |
| | | | 89/36.13 | |
| 2,395,899 A * | 3/1946 | Morrow | F41A 27/18 | |
| | | | 439/21 | |
| 2,457,824 A | 1/1949 | Kochevar | | |
| 2,520,736 A * | 8/1950 | Reek | F41A 23/24 | |
| | | | 89/37.16 | |
| 2,594,198 A * | 4/1952 | Motley | F16C 19/50 | |
| | | | 89/36.13 | |
| 2,765,054 A * | 10/1956 | Rossman | F41A 23/56 | |
| | | | 89/41.12 | |
| 3,112,674 A * | 12/1963 | Jasse | F41A 23/54 | |
| | | | 89/37.05 | |
| 3,170,738 A * | 2/1965 | Winfree | F41A 23/00 | |
| | | | 411/948 | |
| 3,687,404 A * | 8/1972 | Werner | F16F 1/3863 | |
| | | | 403/228 | |
| 3,827,172 A * | 8/1974 | Howe | F41A 23/00 | |
| | | | 42/94 | |
| 3,905,449 A * | 9/1975 | Uphoff | B60R 3/005 | |
| | | | 182/113 | |
| RE28,876 E * | 6/1976 | Notestine | B60R 21/13 | |
| | | | 296/102 | |
| 3,995,509 A * | 12/1976 | Backus | F41A 27/20 | |
| | | | 89/41.02 | |
| 4,149,448 A * | 4/1979 | Kaustrater | F41A 27/08 | |
| | | | 89/37.03 | |
| 4,236,607 A * | 12/1980 | Halwes | F16F 13/22 | |
| | | | 188/379 | |
| 4,248,400 A * | 2/1981 | Takagi | B60G 13/003 | |
| | | | 248/635 | |
| 4,854,628 A * | 8/1989 | Halberg | B60P 1/00 | |
| | | | 296/3 | |
| 5,011,108 A * | 4/1991 | Chen | F16F 15/03 | |
| | | | 248/550 | |
| 5,024,138 A * | 6/1991 | Sanderson | F41A 23/00 | |
| | | | 89/37.19 | |
| 2,712,271 A * | 7/1995 | Wabnitz | F41A 27/18 | |
| | | | 89/36.13 | |
| 5,799,923 A * | 9/1998 | Carr | F16F 1/3732 | |
| | | | 248/638 | |
| 6,071,036 A * | 6/2000 | Ruckert | B62D 65/06 | |
| | | | 248/634 | |
| 6,101,917 A * | 8/2000 | Klatte | F41A 27/22 | |
| | | | 89/41.01 | |
| 6,286,411 B1 * | 9/2001 | Sanderson | B64D 7/02 | |
| | | | 89/37.14 | |
| 7,423,211 B2 * | 9/2008 | Hsieh | G10D 13/063 | |
| | | | 248/443 | |
| 7,478,580 B1 * | 1/2009 | Parimi | F41H 5/0407 | |
| | | | 89/36.13 | |
| 7,963,205 B1 * | 6/2011 | Brooks | F41A 27/14 | |
| | | | 89/37.03 | |
| 8,347,776 B2 * | 1/2013 | Frey | F41A 23/52 | |
| | | | 89/40.03 | |
| 8,434,395 B1 * | 5/2013 | Petrosillo | F41H 5/06 | |
| | | | 89/36.01 | |
| 8,443,710 B2 * | 5/2013 | Domholt | F41A 27/20 | |
| | | | 89/41.02 | |
| 8,578,644 B1 * | 11/2013 | Oquin | F41G 11/003 | |
| | | | 89/37.03 | |
| 8,584,573 B2 * | 11/2013 | Prado | F41A 23/34 | |
| | | | 89/37.03 | |
| 8,910,559 B1 * | 12/2014 | Berman | F41H 5/263 | |
| | | | 89/36.13 | |
| 8,967,666 B2 * | 3/2015 | Lardella | F41A 27/14 | |
| | | | 280/756 | |
| 9,328,986 B1 * | 5/2016 | Pennau | F41A 23/20 | |
| 9,389,038 B1 * | 7/2016 | Leavitt | F41A 23/24 | |
| 9,423,200 B1 * | 8/2016 | Fowler, IV | F41A 27/08 | |
| 9,739,561 B1 * | 8/2017 | Hagedorn | F41A 27/18 | |
| 10,969,189 B1 * | 4/2021 | Luis y Prado | F41A 27/18 | |
| 11,644,081 B2 * | 5/2023 | Fierro | F16F 15/046 | |
| | | | 267/220 | |
| 2003/0057334 A1 * | 3/2003 | Suka | B60K 17/24 | |
| | | | 248/608 | |
| 2004/0237372 A1 * | 12/2004 | Frye | F41A 23/16 | |
| | | | 89/37.04 | |
| 2007/0131103 A1 * | 6/2007 | Mcclellan | F41H 5/12 | |
| | | | 89/37.03 | |
| 2009/0243327 A1 * | 10/2009 | Koga | B60N 2/34 | |
| | | | 296/65.15 | |
| 2011/0023698 A1 * | 2/2011 | Hayden | F41G 5/24 | |
| | | | 89/41.02 | |
| 2012/0024143 A1 * | 2/2012 | Shacklee | F41G 5/14 | |
| | | | 89/41.02 | |
| 2012/0180643 A1 * | 7/2012 | Woods | F41A 27/14 | |
| | | | 89/37.04 | |
| 2013/0000477 A1 * | 1/2013 | Larue | F41A 23/02 | |
| | | | 89/37.04 | |
| 2013/0243526 A1 * | 9/2013 | Williamson | A47L 11/4097 | |
| | | | 405/271 | |
| 2014/0311331 A1 * | 10/2014 | Hagedorn | F41A 9/00 | |
| | | | 89/37.03 | |
| 2016/0258704 A1 * | 9/2016 | Hobson | F41A 27/28 | |
| 2018/0266622 A1 * | 9/2018 | Woodbury | B60N 2/506 | |
| 2019/0162268 A1 * | 5/2019 | Chang | B64D 47/08 | |
| 2020/0317095 A1 * | 10/2020 | Woodbury | F16F 15/022 | |
| 2022/0178642 A1 * | 6/2022 | Takach | F41A 23/24 | |
| 2023/0118117 A1 * | 4/2023 | Terry | B64D 43/00 | |
| | | | 267/292 | |

* cited by examiner

MODULAR INTEGRATION KIT FOR A POSITIONING SYSTEM

CROSS-REFERENCE TO RELATED APPLICATIONS

This application claims benefit to U.S. Provisional Patent Application No. 63/050,060, filed on Jul. 9, 2020, entitled "Modular Integration Kit for a Positioning System", which is incorporated by reference in its entirety.

FIELD OF THE DISCLOSURE

The present disclosure is directed to a means, system and method for integrating a positioning system, on a vehicle, like a vehicle mounted, laser guided rocket launcher. More specifically, the present disclosure is directed to a modular integration kit for a positioning system.

BACKGROUND

With the variety of vehicles, vessels, and other crafts that require an integration kit for a positioning system to position a payload, the present disclosure enables a wide array of these vessels, vehicles, and crafts to be integrated with a high percentage of common parts. This commonality reduces costs, enables "economies of scale" in the production of most of the components, and increases commonality and interoperability in certain environments, to enable spare parts to be shared across users of different systems, but which are largely common.

As a result, the instant disclosure may be designed to address at least certain aspects of the problems or needs discussed above by providing of a modular integration kit for a positioning system.

SUMMARY

The present disclosure may solve the aforementioned limitations of the currently available vehicles and positioning systems therefore, by providing a modular integration kit for a positioning system. The modular integration kit for a positioning system, like a positioning system on a vehicle, may generally include a configurable foundation plate, a dampened bolting structure, and a modular vibration isolation assembly. The configurable foundation plate may be configured to attach to the positioning system, like a positioning system on a vehicle. The dampened bolting structure may be affixed to the configurable foundation plate. The dampened bolting structure may be configured to attach a payload to the positioning system, like for attaching a payload of a rifle, an optic and/or a rocket launcher onto a positioning system on a vehicle (car, truck, military vehicle, boat, aircraft, the like, etc.). The modular vibration isolation assembly may be arranged between the configurable foundation plate and the dampened bolting structure. The modular vibration isolation assembly may be configured to dampen the dampened bolting structure from movements of the configurable foundation plate attached to the positioning system, like a positioning system on a vehicle.

One feature of the disclosed modular integration kit for a position system may be that the modular vibration isolation assembly can be configured to be sized to accommodate a weight and an action of the payload.

In select embodiments of the disclosed modular integration kit for a positioning system, the modular vibration isolation assembly may include at least one vibration isolation element. Each of the at least one vibration isolation elements may be positioned between the configurable foundation plate and the dampened bolting structure. Each of the at least one vibration isolation elements may include a bottom bayonet style shock absorber and a top bayonet style shock absorber. The bottom bayonet style shock absorber of each of the at least one vibration isolation elements may be positioned between the configurable foundation plate and the dampened bolting structure. The top bayonet style shock absorber of each of the at least one vibration isolation elements may be positioned between the dampened bolting structure and a washer. A fastener may be connected between the washer and the configurable foundation plate. The fastener may be configured to pretension the top bayonet style shock absorber and the bottom bayonet style shock absorber. In select possibly preferred embodiments, the bottom bayonet style shock absorber and the top bayonet style shock absorber may be microcellular urethane bayonet style shock absorbers. Wherein a type and a number of microcellular urethane style shock absorbers used in the modular vibration isolation assembly may be set based on the weight and the action of the payload.

Another feature of the disclosed modular integration kit for a positioning system may be that, in select embodiments, the configurable foundation plate can be configured to be attached to a turret ring. In these embodiments or turret configurations, the configurable foundation plate may have a length configured to horizontally span the turret ring. In select embodiments, the configurable foundation plate may include adapter rings on one or both ends. The adapter rings may be configured with adapter bolt hole patterns configured to adapt to various sizes and turret bolt hole patterns of the turret ring.

Another feature of the disclosed modular integration kit for a positioning system may be that, in select embodiments, the configurable foundation plate may include a manual link. The manual link may be affixed to the configurable foundation plate. The manual link may be configured to provide a means for manually moving the configurable foundation plate.

Another feature of the disclosed modular integration kit for a positioning system may be the inclusion of a G-meter. The G-meter may be attached to the dampened bolting structure. The G-meter may be configured to be a shock-indicating device for the payload configured to record tri-axis g-force levels as well as to compute resultant g-force loads. Wherein, in select embodiments, the G-meter may be an electronic or mechanical device configured to contain indicator elements which indicate outwardly for the users whether the payload was subjected to shock loading in excess of certain limits or amounts. As an example, and clearly not limited thereto, the G-meter may include a green, amber and red lights configured to indicate that the payload has been exposed to excessive G-force loading. In select embodiments, the G-meter may be affixed on the dampened bolting structure above the modular vibration isolation assembly, whereby the G-meter is configured to provide accurate indications of the loadings that have been experienced by the payload.

Another feature of the disclosed modular integration kit for a positioning system may be that, in select embodiments, the dampened bolting structure can include a pedestal assembly, a bellcrank assembly, an actuator assembly, the like, and/or combinations thereof. The bellcrank assembly may be pivotally mounted to the pedestal assembly. The bellcrank assembly may include quick release fasteners or pins configured for mounting the payload. The payload may include, but is not limited to, a rifle, an optic, a laser, a rocket launcher, the like, and/or combinations thereof. The actuator assembly may be configured to control the angular movement of the bellcrank assembly about the pedestal assembly. In select embodiments, the actuator assembly may include an actuator. The actuator may include, but is not limited to, an electrical actuator, a pneumatic actuator, a hydraulic actuator, an electro-hydraulic actuator operated with a handheld controller, the like, and/or combinations thereof. In a possibly preferred embodiment, the actuator may be an electro-hydraulic actuator operated with a hand-held controller. In select embodiments, an actuator control box may be included. The actuator control box may be configured for controlling the actuator. In select embodiments, the actuator control box may be affixed to an adapter ring of the configurable foundation plate.

Another feature of the disclosed modular integration kit for a positioning system may be the inclusion, in select embodiments, of a foldable load spreader. The foldable load spreader may be sized for the storage area of a vehicle. The foldable load spreader may be configured to be folded and oriented in a vehicle for spreading or separating various loads, like a rocket launcher from rockets and/or rocket tubes or containers. In select embodiments, the foldable load spreader may include two hinges configured with 270 degrees of ration. In these 270 degree hinge embodiments, the foldable load spreader is configured to be folded into a flat shape, a z-shape, a U-shape, the like, and/or combinations thereof.

Another feature of the disclosed modular integration kit for a positioning system may be the inclusion, in select embodiments, of a vibration isolating storage board. The vibration isolating storage board is configured to be mounted in a vehicle for storing and vibration isolating various loads on the vehicle. The vibration isolating storage board may include a plurality of vibration isolators positioned underneath the vibration isolating storage board. The vibration isolating storage board may also be utilized for transporting or storing the disclosed modular integration kit, like where the disclosed modular integration kit is shipped on a standard shipping pallet and the vibration isolating storage board is positioned between the disclosed modular integration kit and the standard shipping pallet.

Another feature of the disclosed modular integration kit for a positioning system may be that the modular integration kit can be configured to be stored and shipped on a standard pallet for commercial shipping. Accordingly, the configurable foundation plate with adapter rings, the dampened bolting structure, the modular vibration isolation assembly, the manual link, the pedestal assembly, and the bellcrank assembly can be disassembled and stored in a storage case. Once stored in the storage case, the storage case can be secured on top of the vibration isolating storage board positioned on the standard pallet. The foldable load spreader can be folded and positioned on the standard pallet beside the storage case.

Another feature of the disclosed modular integration kit for a positioning system may be that it can be configured for a variety of vehicles, vessels, and other crafts that require an integration kit for a positioning system to position the payload. As such, the disclosed modular integration kit for a positioning system may enable a wide array of such variety of vehicles, vessels, and other crafts to be integrated with a high percentage of common parts.

Another feature of the disclosed modular integration kit for a positioning system may be that it can be configured for a commonality of parts configured to reduce costs, enable economies of scale in the production of most components, and increase commonality and interoperability in certain environments. As such, the disclosed modular integration kit for a positioning system may enable spare parts to be shared across users of different systems, but which are largely common.

Another feature of the disclosed modular integration kit for a positioning system may be that it can be configured for having the ability to be adapted to a plethora of turret configurations, vendors, and sizes with largely the same components. As such, the disclosed modular integration kit may be utilized on vehicles with different fitments of bearing systems or turrets pivoting around a central axis, or turret systems with bearings and a bore through which a user could stand to manually operate an optical system, where manufacturers of these various turret systems have different features and designs, as well as various sizes or diameters of the turret, and some turrets have motorized rotation while others have manual cranks to rotate them.

Another feature of the disclosed modular integration kit for a positioning system may be that it can be configured for any cars, trucks, tracked ground vehicles, boats, aircrafts, the like, and/or provide any cross use therebetween.

In another aspect, the instant disclosure embraces the modular vibration isolation assembly for the positioning system in any of the various embodiments and/or combination of embodiments shown and/or described herein. The disclose modular vibration isolation assembly may generally include at least one vibration isolation element. Each of the at least one vibration isolation elements may be positioned between a configurable foundation plate and a dampened bolting structure, or the like. Each of the at least one vibration isolation elements may include a bottom bayonet style shock absorber and a top bayonet style shock absorber. The bottom bayonet style shock absorber may be positioned between the configurable foundation plate and the dampened bolting structure. The top bayonet style shock absorber may be positioned between the dampened bolting structure and a washer (or it could be reversed). A fastener, like a bolt, may be connected between the washer and the configurable foundation plate. The fastener may be configured to pretension the top bayonet style shock absorber and the bottom bayonet style shock absorber above and below the dampened bolting structure.

One feature of the disclosed modular vibration isolation assembly may be that it can be configured and/or sized to accommodate a weight and an action of a payload attached to the dampened bolting structure.

In select possibly preferred embodiments of the disclosed modular vibration isolation assembly, the bottom bayonet style shock absorber and the top bayonet style shock absorber may be microcellular urethane bayonet style shock absorbers. Wherein a type and a number of the microcellular urethane style shock absorbers used in the modular vibration isolation assembly may be set or determined based on the weight and the action of the payload.

Another feature of the disclosed modular vibration isolation assembly may be that, in select embodiments, each of the at least one vibration isolation elements may be arranged in groups of four. In select possibly preferred embodiments, these groups of four of the vibration isolation elements may be arranged in a rectangular or square configuration.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
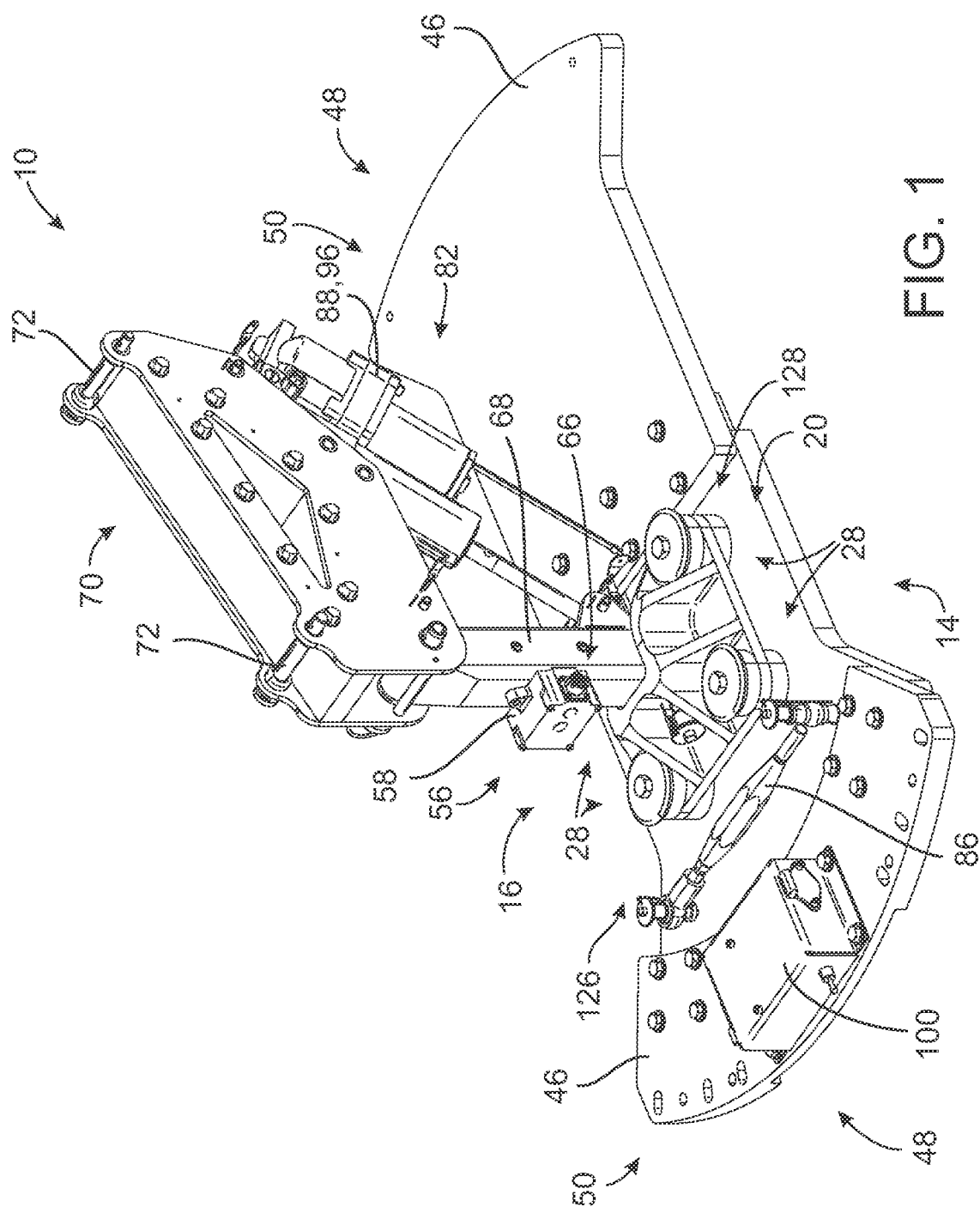
FIG. 1 shows a front perspective view of the modular integration kit for a positioning system according to select embodiments of the instant disclosure.
Figure 2:
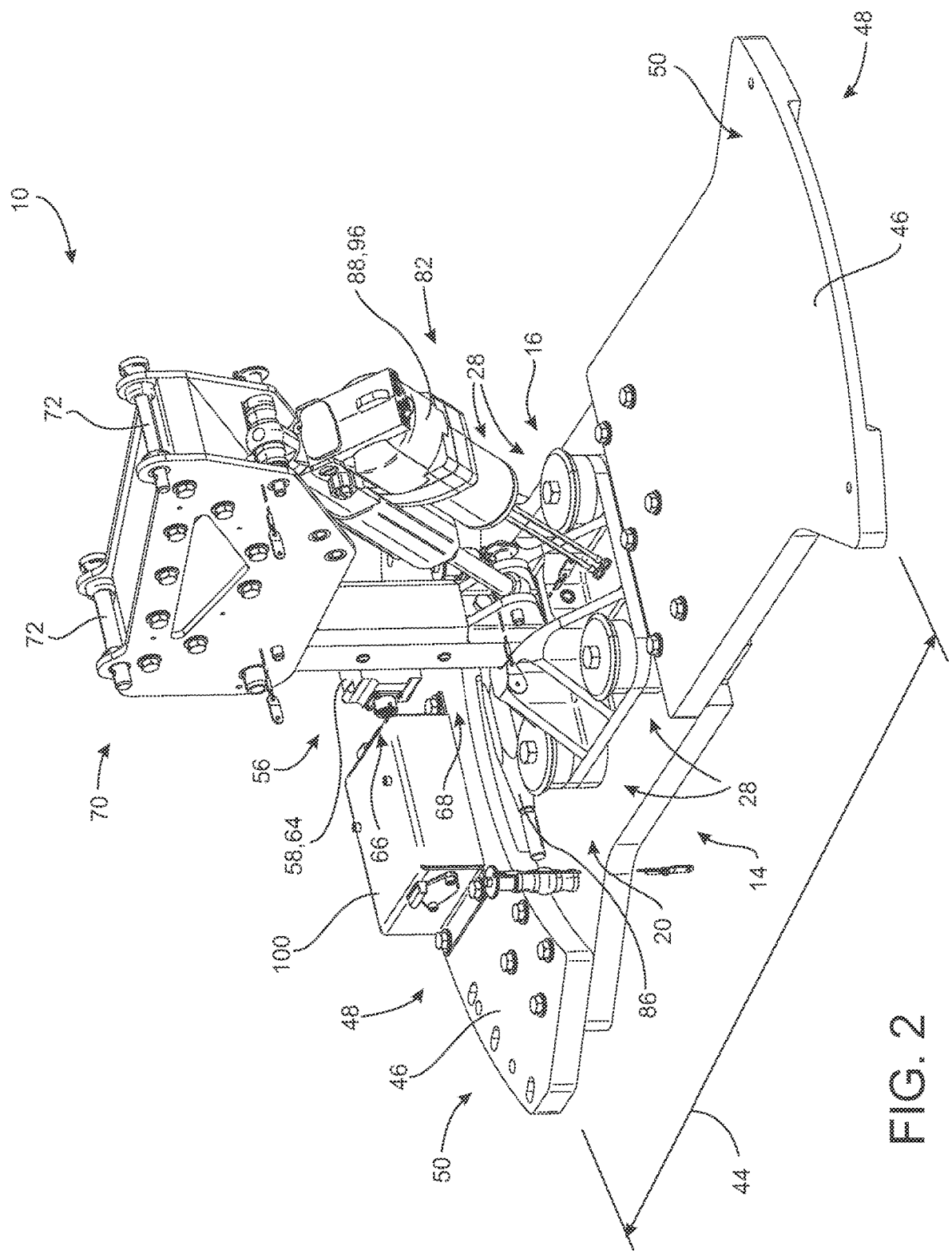
FIG. 2 shows a rear perspective view of the modular integration kit for a positioning system of FIG. 1.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-16, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring to FIGS. 1-16, the present disclosure may solve the aforementioned limitations of the currently available vehicles and positioning systems therefore, by providing modular integration kit 10. Modular integration kit 10 may be for providing a modular or universal means and mechanism for upfitting various positioning systems on vehicles, including, but not limited to, positioning system 12 on vehicle 106 shown herein. Positioning system 12 may include any style or type of positioning systems for various rifles, optics, rocket launchers, the like etc., including but not limited to, turret ring 42 shown herein, or the like. Modular integration kit 10 for positioning system 12, like positioning system 12 on vehicle 106, may generally include configurable foundation plate 14, dampened bolting structure 16, and modular vibration isolation assembly 20. Configurable foundation plate 14 may be configured to attach to positioning system 12, like positioning system 12 on vehicle 106. Configurable foundation plate 14 may include any shape, size, design, and/or configuration configured to attach modular integration kit 10 and its components onto any various sizes, shapes, designs, and/or configurations of positioning systems or the like. Dampened bolting structure 16 may be affixed to configurable foundation plate 14. Dampened bolting structure 16 may be configured to attach payload 18, like for attaching a payload of a rifle, an optic and/or a rocket launcher onto vehicle 106. However, the disclosure is not so limited, and dampened bolting structure 16 may include any various sizes, shapes, designs and/or configurations for attaching any various size, shape, design and/or configuration of a payload. Modular vibration isolation assembly 20 may be arranged between configurable foundation plate 14 and dampened bolting structure 16. Modular vibration isolation assembly 20 may be configured to dampen dampened bolting structure 16 from movements of configurable foundation plate 14 attached to positioning system 12, including, but not limited to, positioning system 12 on vehicle 106.

Figure 3:
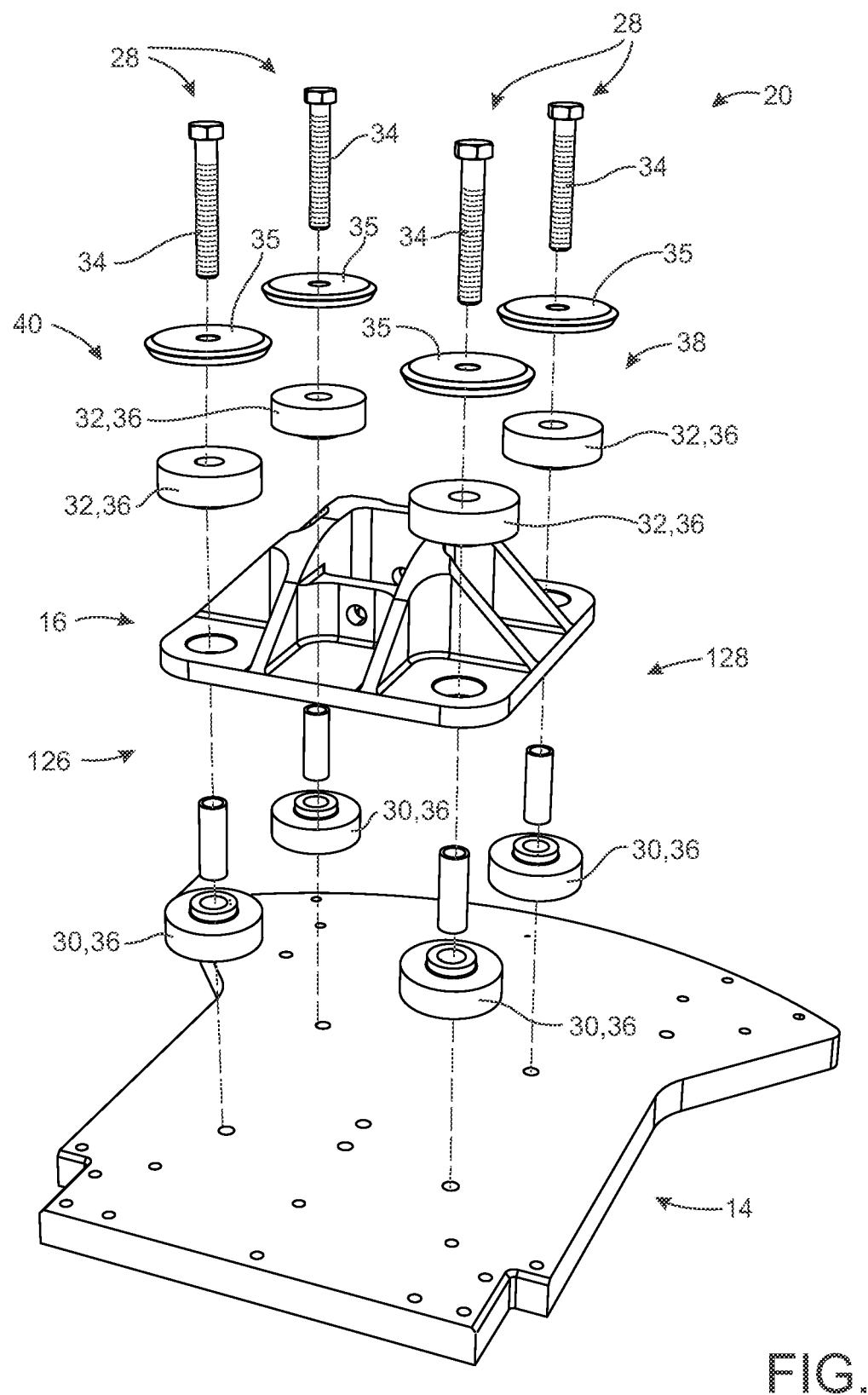
FIG. 3 shows a disassembled perspective view of the modular vibration isolation assembly according to select embodiments of the instant disclosure for use in the disclosed modular integration kit for a positioning system.

Referring now specifically to FIG. 3, modular vibration isolation assembly 20 is shown as a component of modular integration kit 10. Modular vibration isolation assembly 20 may be sized and/or configured to accommodate a weight (i.e., size and mass of the payload) and an action (i.e., amount of positive and/or negative G-forces expected on the payload) of payload 18. As shown in FIG. 3, in select embodiments of modular integration kit 10 for positioning system 12, modular vibration isolation assembly 20 may include at least one vibration isolation element 28. The number and size of the vibration isolation element provided in modular vibration isolation assembly 20 may vary and may be designed based on the weight and action of payload 18. As shown in FIG. 3, each of the at least one vibration isolation elements 28 may be positioned between configurable foundation plate 14 and dampened bolting structure 16. Each of the at least one vibration isolation elements 28 may include bottom bayonet style shock absorber 30 and top bayonet style shock absorber 32. Bottom bayonet style shock absorber 30 of each of the at least one vibration isolation elements 28 may be positioned between configurable foundation plate 14 and dampened bolting structure 16.

Top bayonet style shock absorber 32 of each of the at least one vibration isolation elements 28 may be positioned between dampened bolting structure 16 and washer 35. Fastener 34, like a bolt or screw, may be connected between washer 35 and configurable foundation plate 14. Fastener 34 may be configured to pretension bottom bayonet style shock absorber 30 and top bayonet style shock absorber 32. In select possibly preferred embodiments, bottom bayonet style shock absorber 30 and top bayonet style shock absorber 32 may be microcellular urethane bayonet style shock absorbers 36. Wherein type 38 and number 40 of microcellular urethane style shock absorbers 36 used in modular vibration isolation assembly 20 may be set based on the weight and the action of payload 18.

Figure 4:
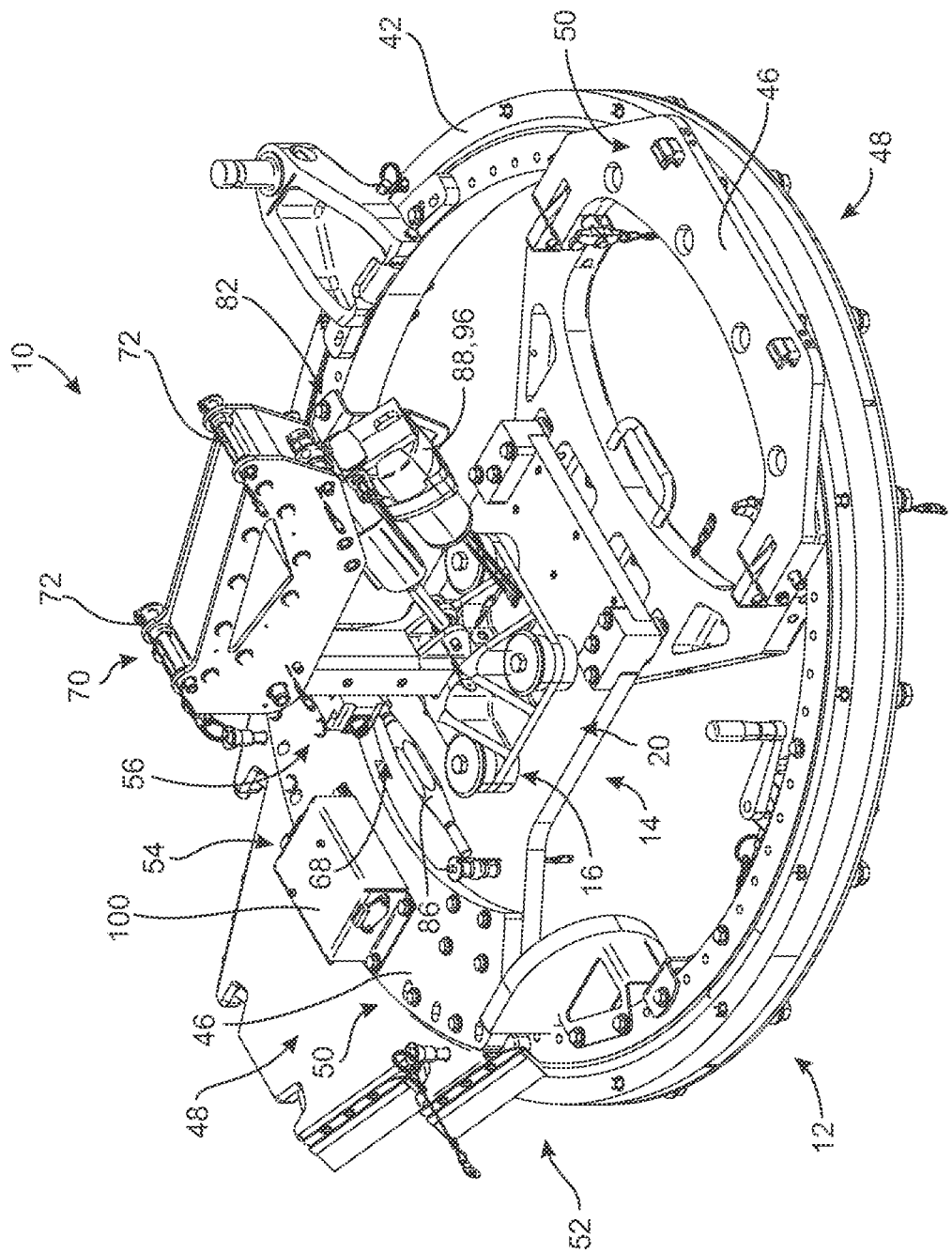
FIG. 4 shows a front perspective view of the modular integration kit for a positioning system according to select embodiments of the instant disclosure being installed on a turret ring from Military Systems Group, Inc. ("MSG") of Nashville, TN with MSG's flip mount utilized upside down.
Figure 5:
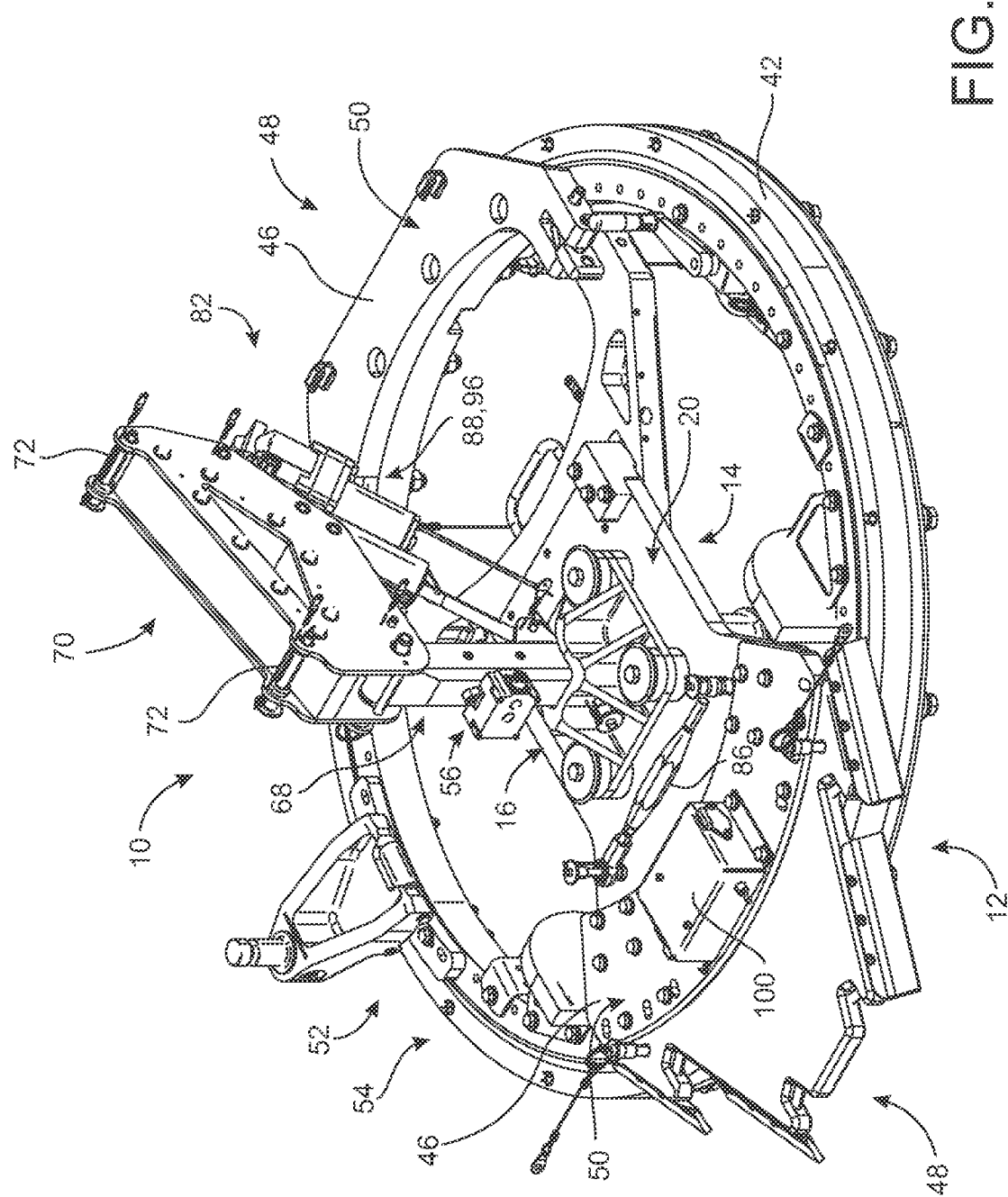
FIG. 5 shows a back perspective view of the modular integration kit for a positioning system of FIG. 4.
Figure 6:
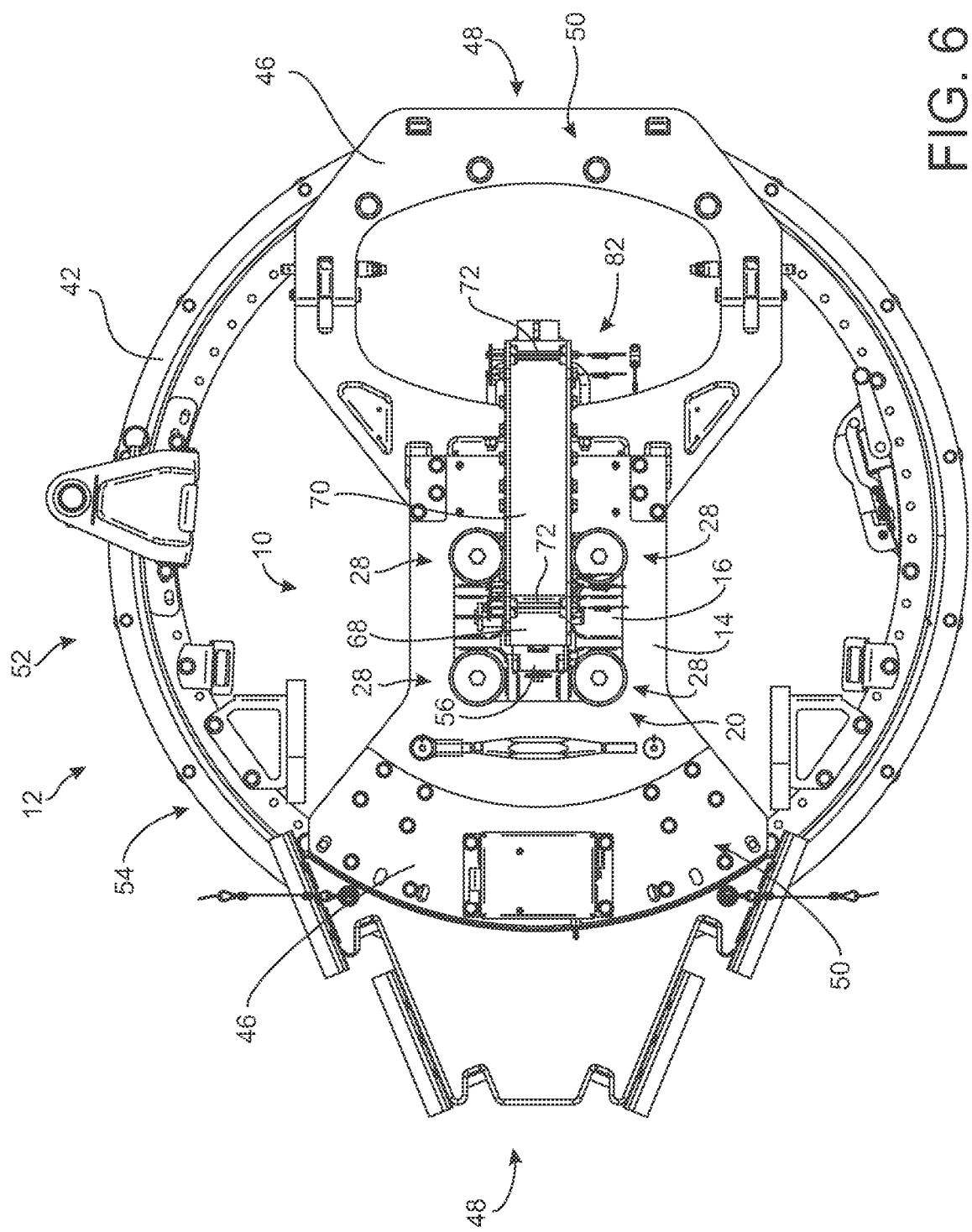
FIG. 6 shows a top view of the modular integration kit for a positioning system of FIG. 4.

Referring now specifically to FIGS. 4-6, another feature of modular integration kit 10 for positioning system 12 may be that in select embodiments configurable foundation plate 14 can be configured to be attached to turret ring 42. In these embodiments or turret configurations, configurable foundation plate 14 may have length 44 configured to horizontally span turret ring 42. In select embodiments, configurable foundation plate 14 may include adapter rings 46 on one or both ends 48 of configurable foundation plate 14. Adapter rings 46 may include various adapter bolt hole patterns 50 configured to adapt to various sizes and turret bolt hole patterns 54 of turret ring 42. In sum, configurable foundation plate 14 may be sized, configured, and/or designed to fit any size, configuration and/or design of a turret ring or other positioning system, or the like. In select embodiments, the configurable foundation plate 14 may also include manual link 86. Manual link 86 may be affixed to configurable foundation plate 14, like as shown in the Figures. Manual link 86 may be configured to provide a means for manually moving configurable foundation plate 14, like for manually manipulating positioning system 12, like for manually manipulating turret ring 42.

Referring now to FIGS. 1-2, 4-6, and 11-12, another feature of modular integration kit 10 for positioning system 12, or the like, may be the inclusion of G-meter 56. G-meter 56 may be any type of G-meter or G-load, or shock-indicating device. G-meter 56 may be attached to dampened bolting structure 16. G-meter 56 may be configured to be shock-indicating device 58 for payload 18 configured to record tri-axis g-force levels as well as to compute resultant g-force loads. Wherein, in select embodiments, G-meter 56 may be an electronic or mechanical device 64 configured to contain indicator elements 66 which indicate outwardly for the users whether payload 18 was subjected to shock loading in excess of certain limits or amounts. As an example, and clearly not limited thereto, G-meter 56 may include a green, amber and/or red lights configured to indicate that payload 18 has been exposed to excessive G-force loading. In select embodiments, G-meter 56 may be affixed on dampened bolting structure 16, or components attached thereto, that are above modular vibration isolation assembly 20, whereby G-meter 56 may be configured to provide accurate indications of the loadings that have been experienced by payload 18 positioned on dampened bolting structure 16.

Referring now to the embodiments shown in FIGS. 1-2 and 4-6, another feature of modular integration kit 10 for positioning system 12 may be that dampened bolting structure may include any components, structures, connection means and/or methods for attaching payload 18. In select embodiments, as shown in the Figures, dampened bolting structure 16 can include pedestal assembly 68, bellcrank assembly 70, actuator assembly 82, the like, and/or combinations thereof. Pedestal assembly 68 may be affixed to dampened bolting structure 16 and may provide a pedestal type mechanism for securing payload 18 above positioning system 12. Bellcrank assembly 70 may be pivotally mounted to pedestal assembly 68. Bellcrank assembly 70 may include quick release fasteners or pins 72 configured for mounting payload 18. Payload 18 may include, but is not limited to, a rifle, an optic, a laser, a rocket launcher, the like, and/or combinations thereof. Actuator assembly 82 may be configured to control angular movement 84 (see FIG. 11) of bellcrank assembly 70 about pedestal assembly 68. As such, actuator assembly 82 may be designed for raising and/or lowering the angle of bellcrank assembly above positioning system 12, like for raising and/or lowering the angle of payload 18, like for raising and/or lowering the angle of any rifles, optics, rocket launchers, the like, etc. Actuator assembly 82 may include any devices, means, mechanisms and/or methods for controlling angular movement 84 of bellcrank assembly 70 about pedestal assembly 68. In select embodiments, actuator assembly 82 may include actuator 88. Actuator 88 may include, but is not limited to, an electrical actuator, a pneumatic actuator, a hydraulic actuator, electro-hydraulic actuator 96 operated with a hand-held controller, the like, and/or combinations thereof. In a possibly preferred embodiment, actuator 88 may be electro-hydraulic actuator 96 operated with a hand-held controller. In select embodiments, actuator control box 100 may be included. Actuator control box 100 may be configured for controlling actuator 88. In select embodiments, as shown in the Figures, actuator control box 100 may be affixed to adapter ring 46 of configurable foundation plate 14.

Figure 7:
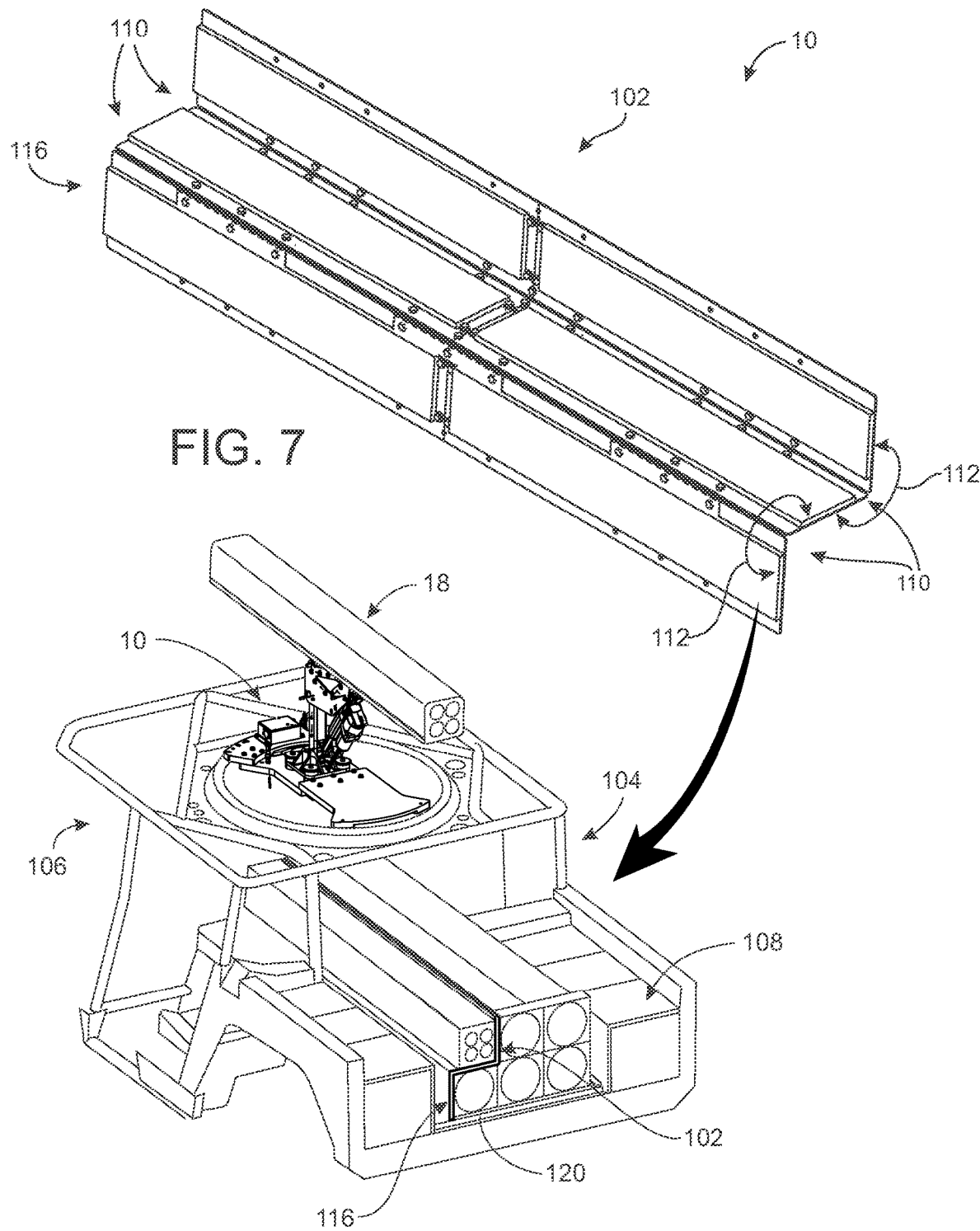
FIG. 7 shows a top perspective view of a foldable load spreader according to select embodiments of the instant disclosure for use in the disclosed modular integration kit for a positioning system.

Referring now specifically to FIG. 7, another feature of modular integration kit 10 for positioning system 12 may be the inclusion, in select embodiments, of foldable load spreader 102. Foldable load spreader 102 may be sized for storage area 104 of vehicle 106. As such, the size, shape, design and/or configuration of foldable load spreader 102 may be modified to fit various sizes, shapes, designs and/or configurations of storage area 104 of various vehicles 106. Foldable load spreader 102 may be configured to be folded and oriented in storage area 104 of vehicle 106 for spreading or separating various loads 108, like a rocket launcher from rockets and/or rocket tubes or containers, as shown in the Figures. In select embodiments, foldable load spreader 102 may include two hinges 110 configured with 270 degrees of rotation 112. With these 270 degrees of rotation 112 hinge 110 embodiments, foldable load spreader 102 may be configured to be folded into flat shape 114 (see FIG. 9), z-shape 116 (see FIG. 7), U-shape 118 (see FIG. 8), the like, and/or combinations thereof.

Figure 8:
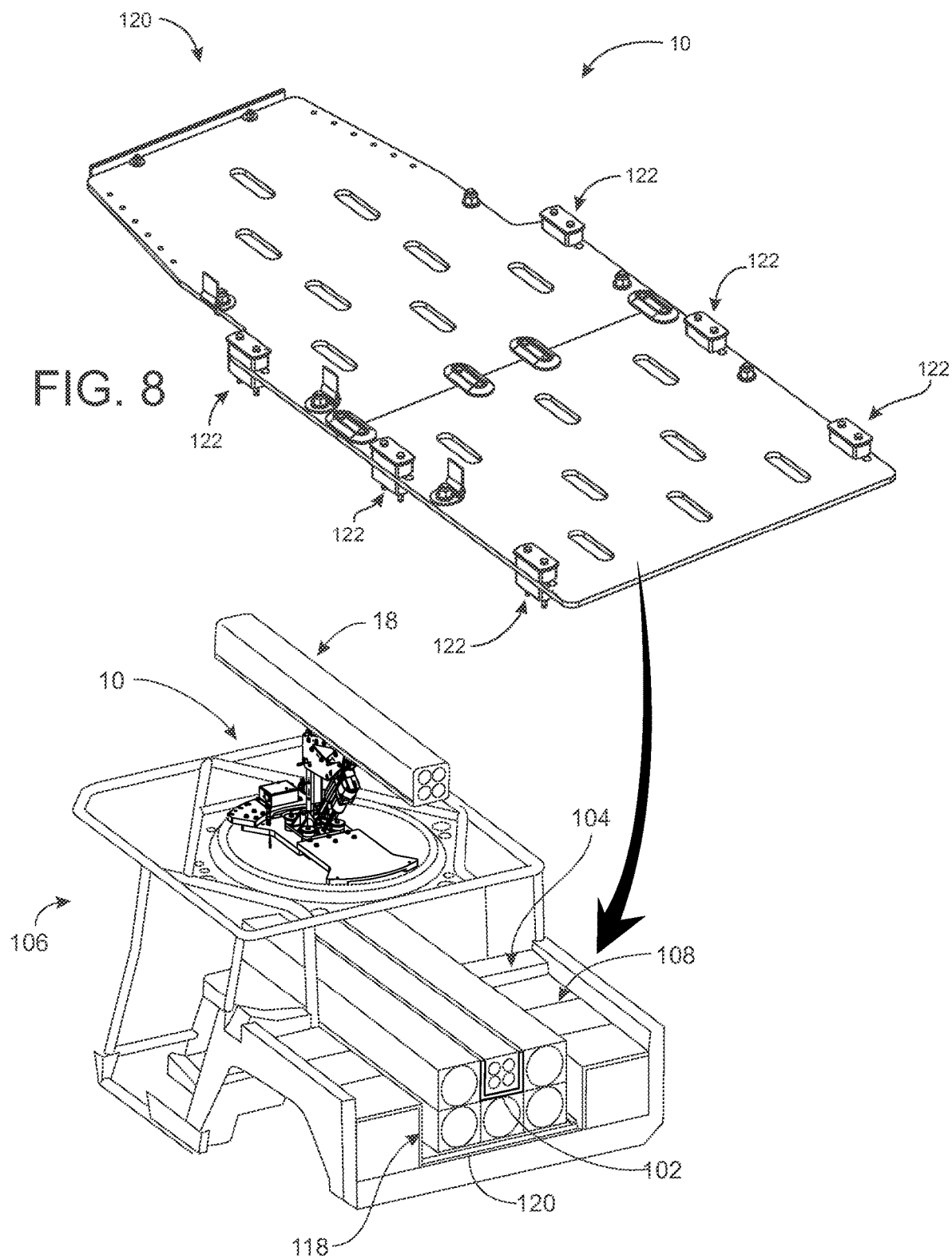
FIG. 8 shows a top perspective view of a vibration isolating storage board according to select embodiments of the instant disclosure for use in the disclosed modular integration kit for a positioning system.

Referring now specifically to FIG. 8, another feature of modular integration kit 10 for positioning system 12 may be the inclusion, in select embodiments, of vibration isolating storage board 120. Vibration isolating storage board 120 may be configured to be mounted in storage area 104 of vehicle 106. Vibration isolating storage board 120 may be sized for storage area 104 of vehicle 106. As such, the size, shape, design and/or configuration of vibration isolating storage board 120 may be modified to fit various sizes, shapes, designs and/or configurations of storage area 104 of various vehicles 106. Vibration isolating storage board 120 may be designed and configured for storing and vibration isolating various loads 108 on vehicle 106. Vibration isolating storage board 120 may include a plurality of vibration isolators 122 positioned underneath vibration isolating storage board 120. The number and type or size of vibration isolators 122 positioned underneath vibration isolating storage board 120 may vary and may be determined based on the weight and action of the load 108 positioned on vibration isolating storage board 120. Vibration isolating storage board 120 may also be utilized for transporting or storing modular integration kit 10, like where modular integration kit 10 is shipped on standard shipping pallet 124 and vibration isolating storage board 120 is positioned between modular integration kit 10 and standard shipping pallet 124.

Figure 9:
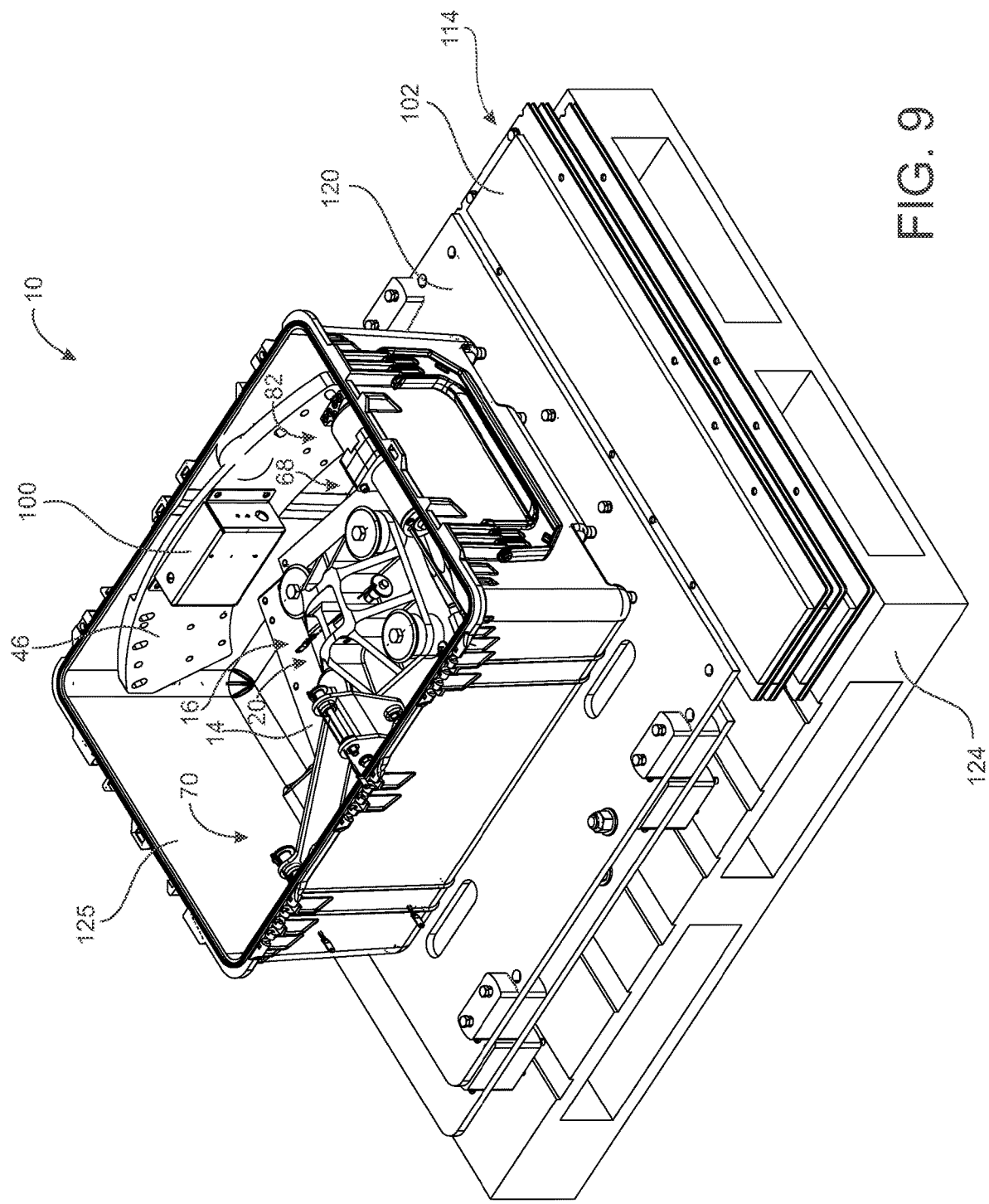
FIG. 9 shows a top perspective view of the modular integration kit for a positioning system according to select embodiments of the instant disclosure disassembled and placed into position on a standard commercial shipping pallet.
Figure 10:
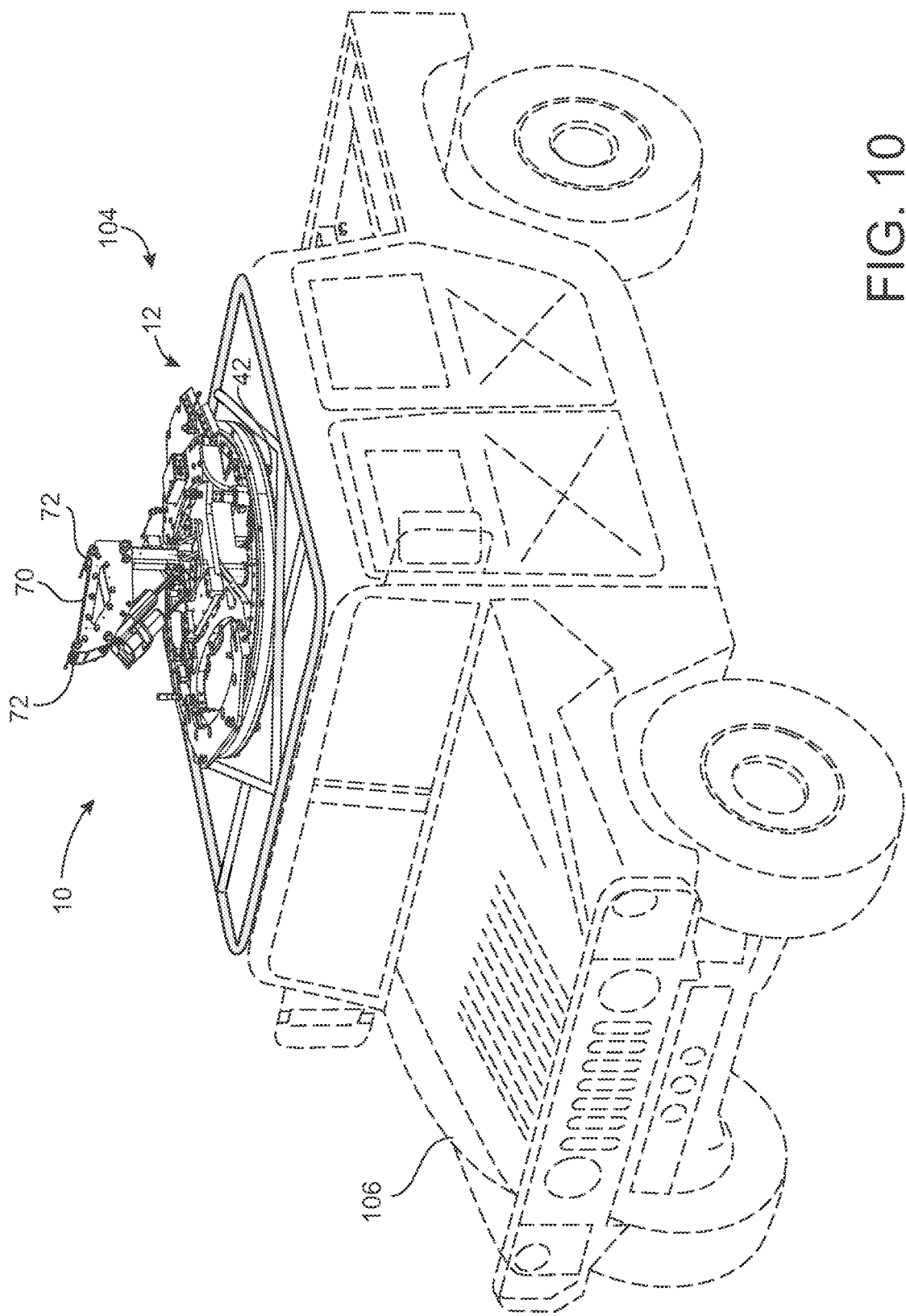
FIG. 10 shows a front perspective view of a vehicle with a turret ring with the modular integration kit for a positioning system according to select embodiments installed thereon.
Figure 11:
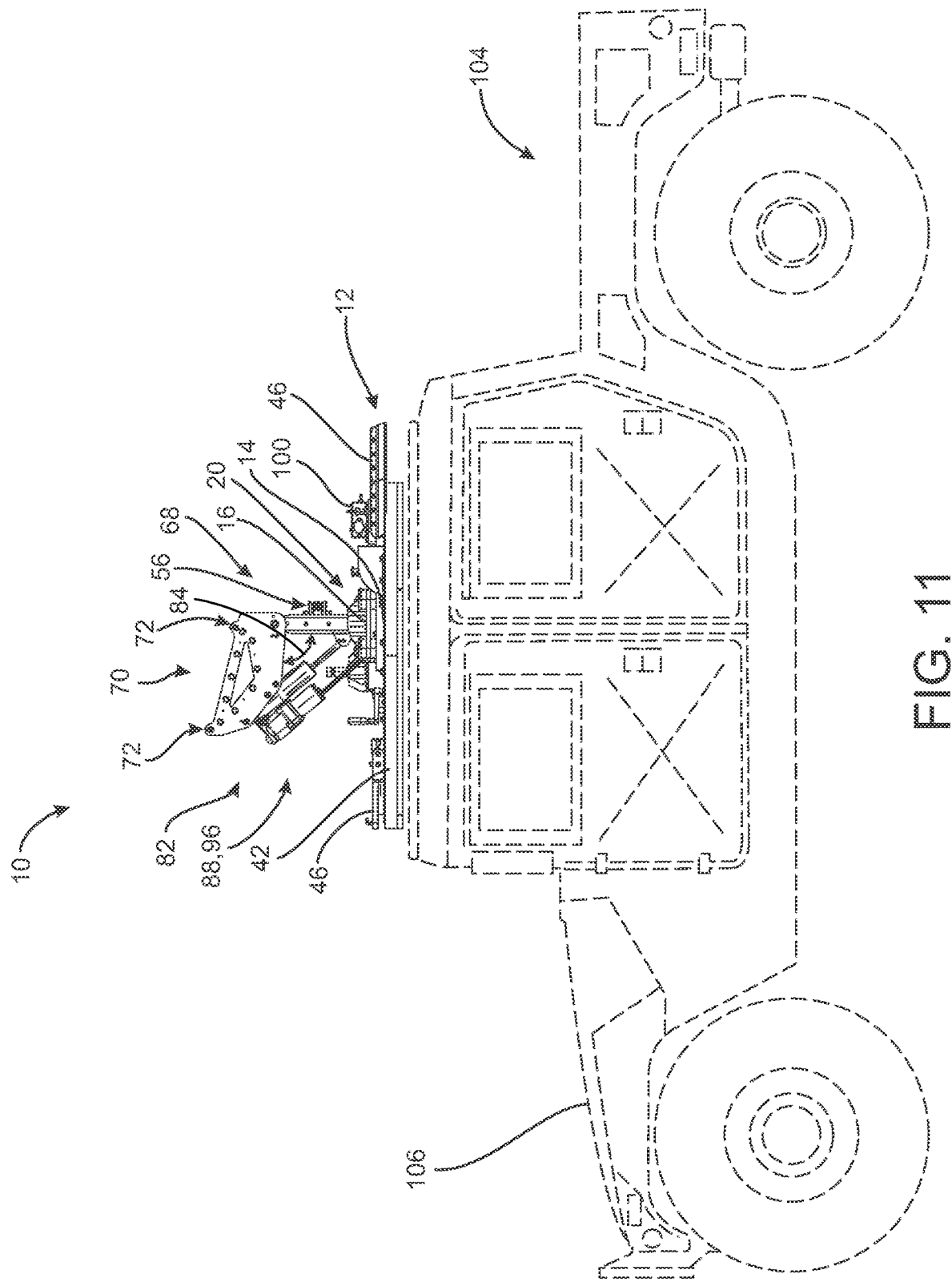
FIG. 11 shows a side view of the vehicle from FIG. 10.
Figure 12:
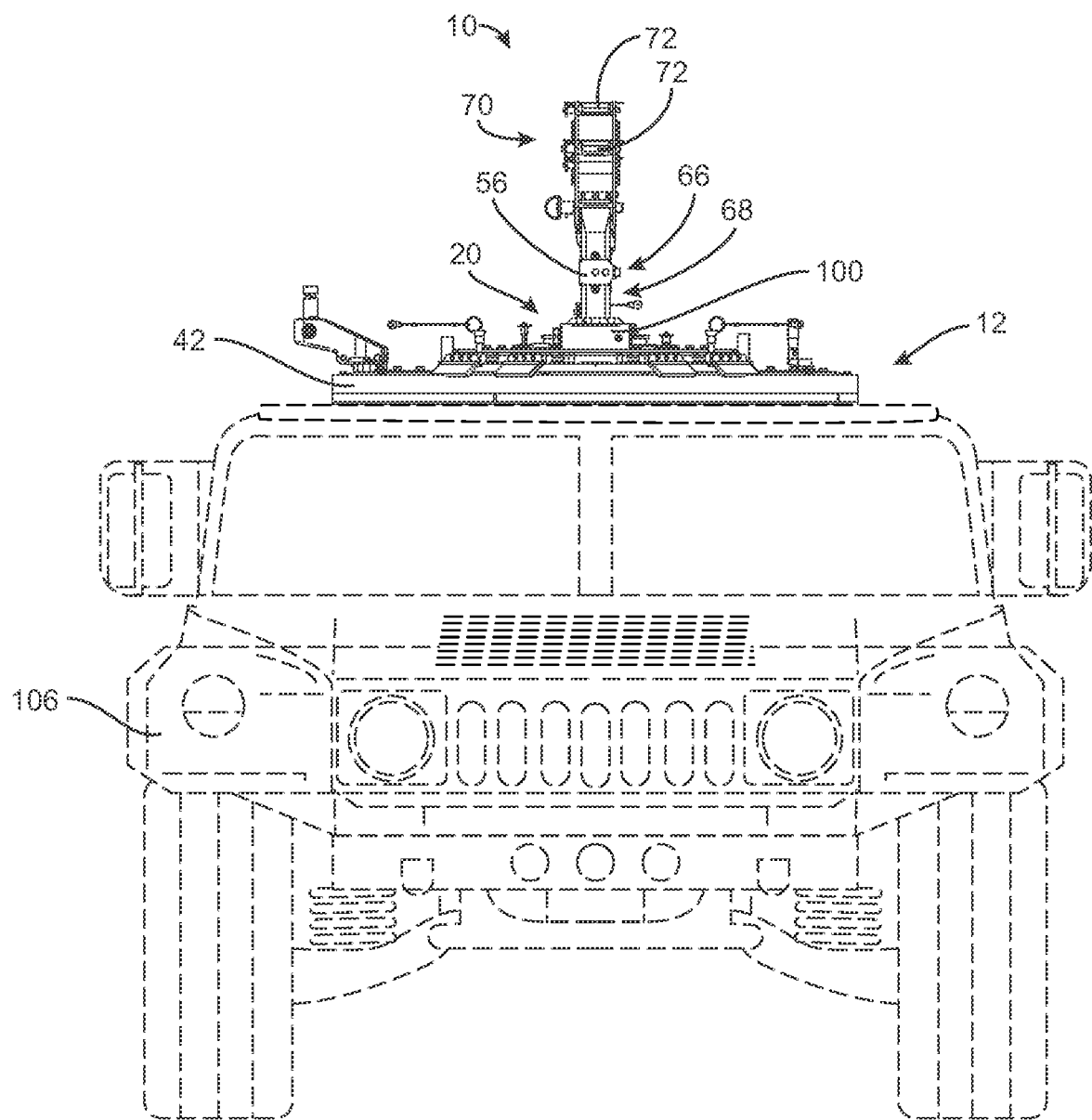
FIG. 12 shows a front view of the vehicle from FIG. 10.
Figure 13:
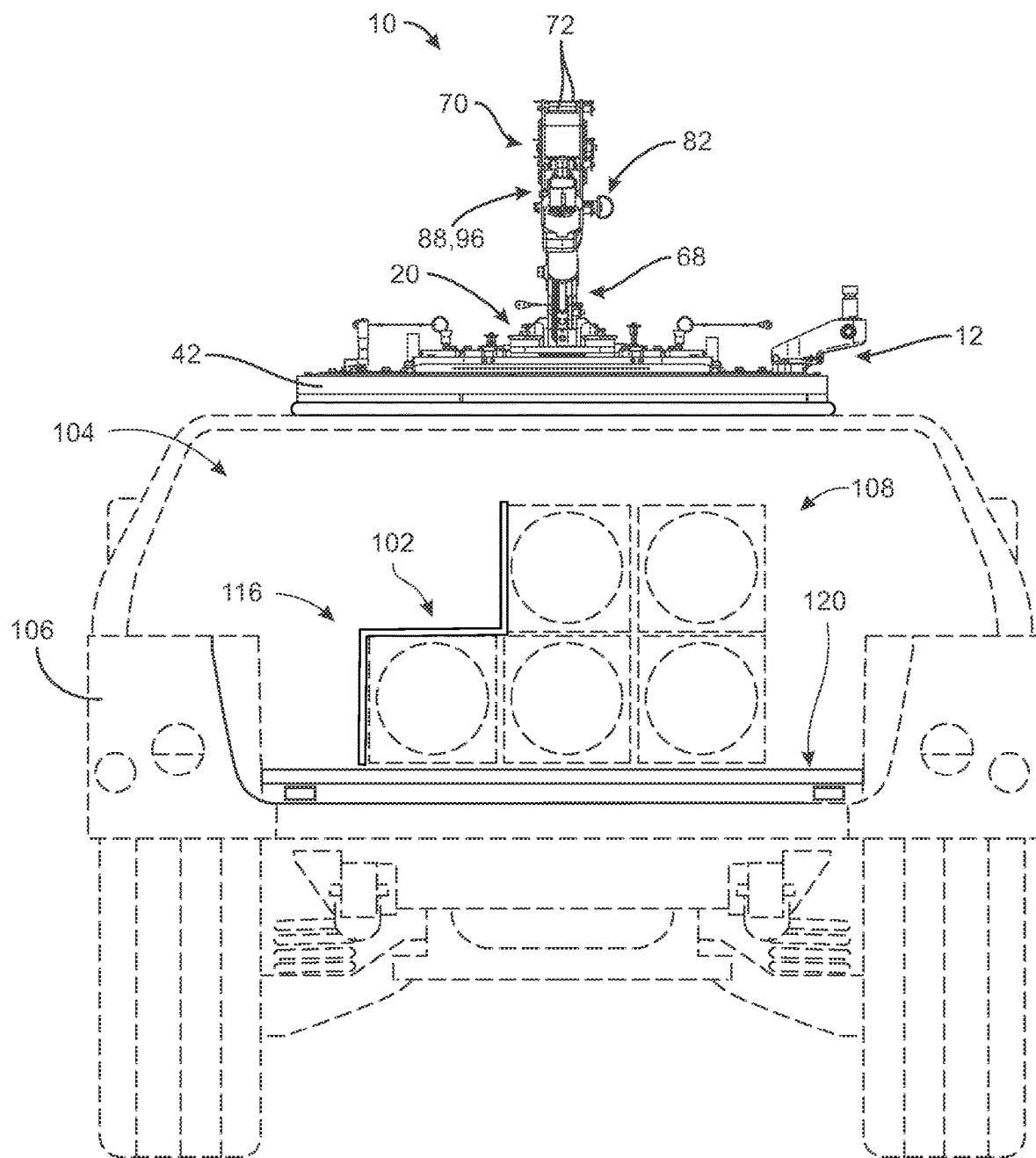
FIG. 13 shows a side view of the vehicle from FIG. 10.

Referring now specifically to FIG. 9, another feature of modular integration kit 10 for positioning system 12 may be that modular integration kit 10 can be configured to be stored and shipped on standard pallet 124 for commercial shipping or for military transport. Accordingly, configurable foundation plate 14 with adapter rings 46, dampened bolting structure 16, modular vibration isolation assembly 20, manual link 86, pedestal assembly 68, and bellcrank assembly 70 can be disassembled and stored in storage case 125. Once stored in storage case 125, storage case 125 can be secured on top of vibration isolating storage board 120 positioned on standard pallet 124. Foldable load spreader 102 can be folded and positioned on standard pallet 124 beside storage case 125. Storage case 125 may be a waterproof and/or crushproof case, like a Pelican storage case from Pelicans Products, Inc. of Torrance, CA (Pelican 1630 shown with foam removed).

Another feature of modular integration kit 10 for positioning system 12 may be that it can be configured for a variety of vehicles, vessels, and other crafts that require modular integration kit 10 for positioning system 12 to position payload 18. As such, modular integration kit 10 for positioning system 12 may enable a wide array of such variety of vehicles, vessels, and other crafts to be integrated with a high percentage of common parts. As shown in FIGS. 10-13, in select embodiments, modular integration kit 10 may be used on vehicle 106, like a military vehicle, including a High Mobility Multipurpose Wheeled Vehicle (HMMWV, like a Humvee provided by AM General of South Bend, IN), as shown in the Figures, a Polaris Dagor Vehicle (provided by Polaris Government & Defense of Polaris Inc. in Medina, MN), tactical vehicles, military boats, the like, etc., or any other vehicle or military vehicle outfitted with a positioning system.

Another feature of modular integration kit 10 for positioning system 12 may be that it can be configured for a commonality of parts configured to reduce costs, enable economies of scale in the production of most components, and increase commonality and interoperability in certain environments. As such, modular integration kit 10 for positioning system 12 may enable spare parts to be shared across users of different systems, but which are largely common.

Another feature of modular integration kit 10 for positioning system 12 may be that it can be configured for having the ability to be adapted to a plethora of turret configurations, vendors, and sizes with largely the same components. As such, modular integration kit 10 may be utilized on vehicles with different fitments of bearing systems or turrets pivoting around a central axis, or turret systems with bearings and a bore through which a user could stand to manually operate an optical system, where manufacturers of these various turret systems have different features and designs, as well as various sizes or diameters of the turret. As examples, some turrets have motorized rotation while others have manual cranks to rotate them, all of which, modular integration kit 10 may be designed and configured for.

Another feature of modular integration kit 10 for positioning system 12 may be that it can be configured for any cars, trucks, tracked ground vehicles, boats, aircrafts, the like, and/or provide any cross use therebetween.

In another aspect, the instant disclosure embraces modular vibration isolation assembly 20 for positioning system 12 in any of the various embodiments and/or combination of embodiments shown and/or described herein, including, but not limited to, the embodiment shown best in FIG. 3. One feature of modular vibration isolation assembly 20 may be that it can be configured and/or sized to accommodate a weight and an action of payload 18 attached to dampened bolting structure 16. In select possibly preferred embodiments of modular vibration isolation assembly 20, bottom bayonet style shock absorber 30 and top bayonet style shock absorber 32 may be microcellular urethane bayonet style shock absorbers 36. Wherein type 38 and/or number 40 of microcellular urethane style shock absorbers 36 used in modular vibration isolation assembly 20 may be set or determined based on the weight and the action of the desired payload.

Another feature of modular vibration isolation assembly 20 may be that, in select embodiments, each of the at least one vibration isolation elements 28 may be arranged in various patterns, groups, lines or shapes and any various number or amount of vibration isolation elements 28. In select embodiments, as shown in the Figures, each of the at least one vibration isolation elements 28 may be arranged in groups of four 126. In select possibly preferred embodiments, these groups of four 126 of vibration isolation elements 28 may be arranged in rectangular or square configuration 128. As shown in the Figures, a single rectangular or square configuration 128 may be utilized for dampening the movements from configurable foundation plate 14 to dampened bolting structure 16. However, the disclosure is not so limited, and multiple rectangular or square configurations 128 may be utilized for dampening the movements from configurable foundation plate 14 to dampened bolting structure 16 depending on the weight and action of payload 18.

As shown in the Figures, the present disclosure can be applied to many systems for payloads which need to be positioned accurately. Examples of these payloads may include, but are not limited to, optical systems used for recording imagery and tracking a subject or gathering and recording information. Additional examples may be, but are not limited to, systems which are used by soldiers, such as for rockets and rifles, or for other purposes like laser identification of targets. Many vehicles have different fitments of bearing systems or turrets pivoting around a central axis, or turret systems with bearings and a bore through which a user could stand to manually operate an optical system, but the manufacturers of these various turret systems have different features and designs, which, without the use of the present embodied disclosure can pose challenges for designers and engineers to standardize their equipment, leading to excessive costs. As well, diameters of the turrets can be larger or smaller; some have motorized or actuator controlled rotation while others have manual mechanisms to rotate them. A key to the effectiveness of the present disclosure may be its ability to be adapted to a plethora of these turret configurations, vendors, and sizes with largely the same components.

Another key feature of the fitment of modular integration kit 10 for positioning system 12 may be the ability to accept modular vibration isolation assembly 20. Because some of the systems to be mounted onto the turret configurations can be rather fragile, for example optics or some types of weapons systems, it is important to be able to provide a vibration isolation functionality in order to preserve these components while operating the vehicle, vessel, or craft in its intended environment. For example, without this vibration isolation via modular vibration isolation assembly 20, the rough seas environment can be so rough as to damage a rocket and make it dangerous to operate. The integration of the vibration isolating elements 28 of modular vibration isolation assembly 20 may address this problem and is scalable to accommodate a variety of weights and payloads.

Figure 14:
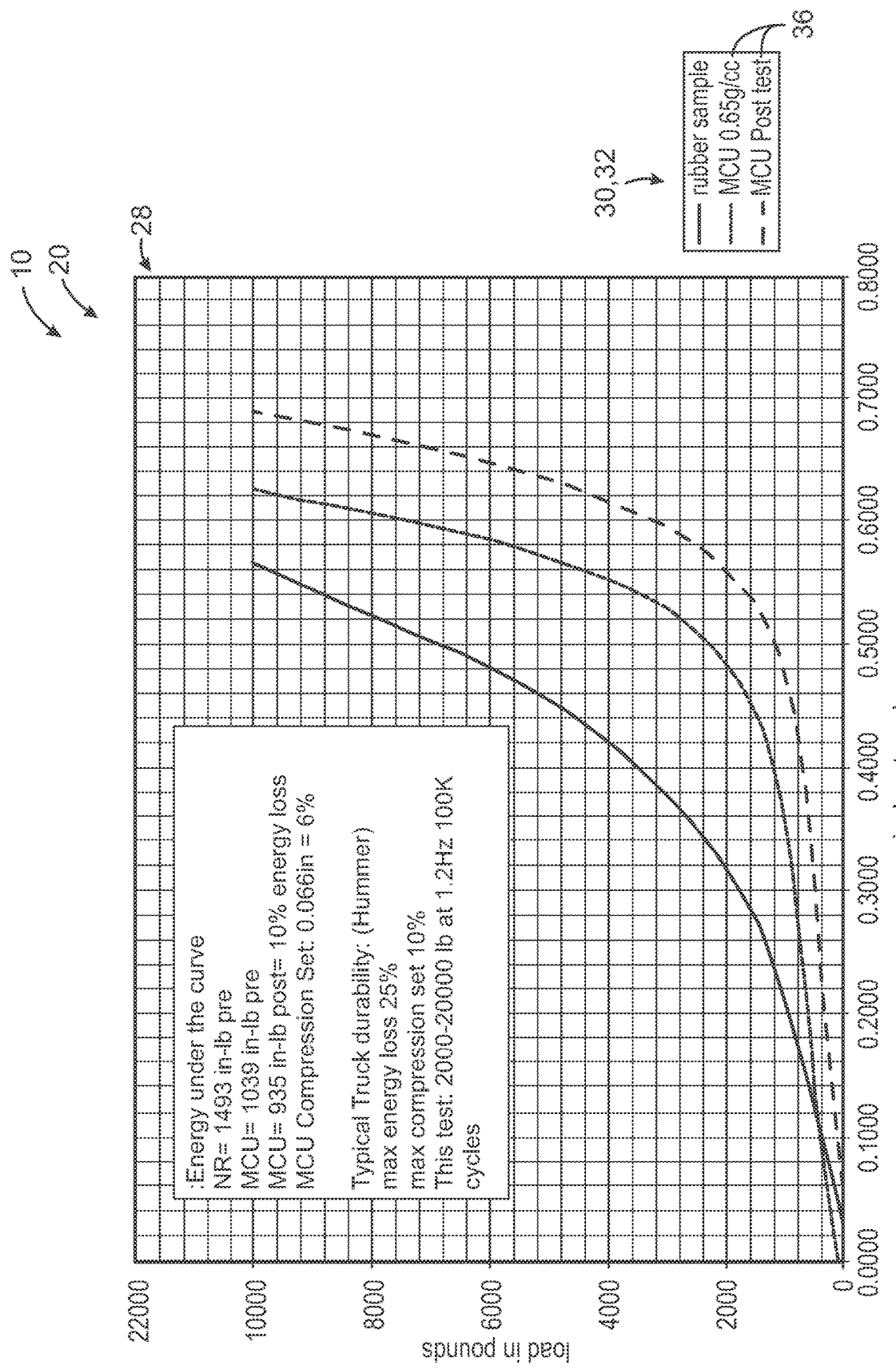
FIG. 14 shows a line graph of various bayonet style shock absorbers according to select embodiments of the instant disclosure in inches traveled per load in pounds.
Figure 15:
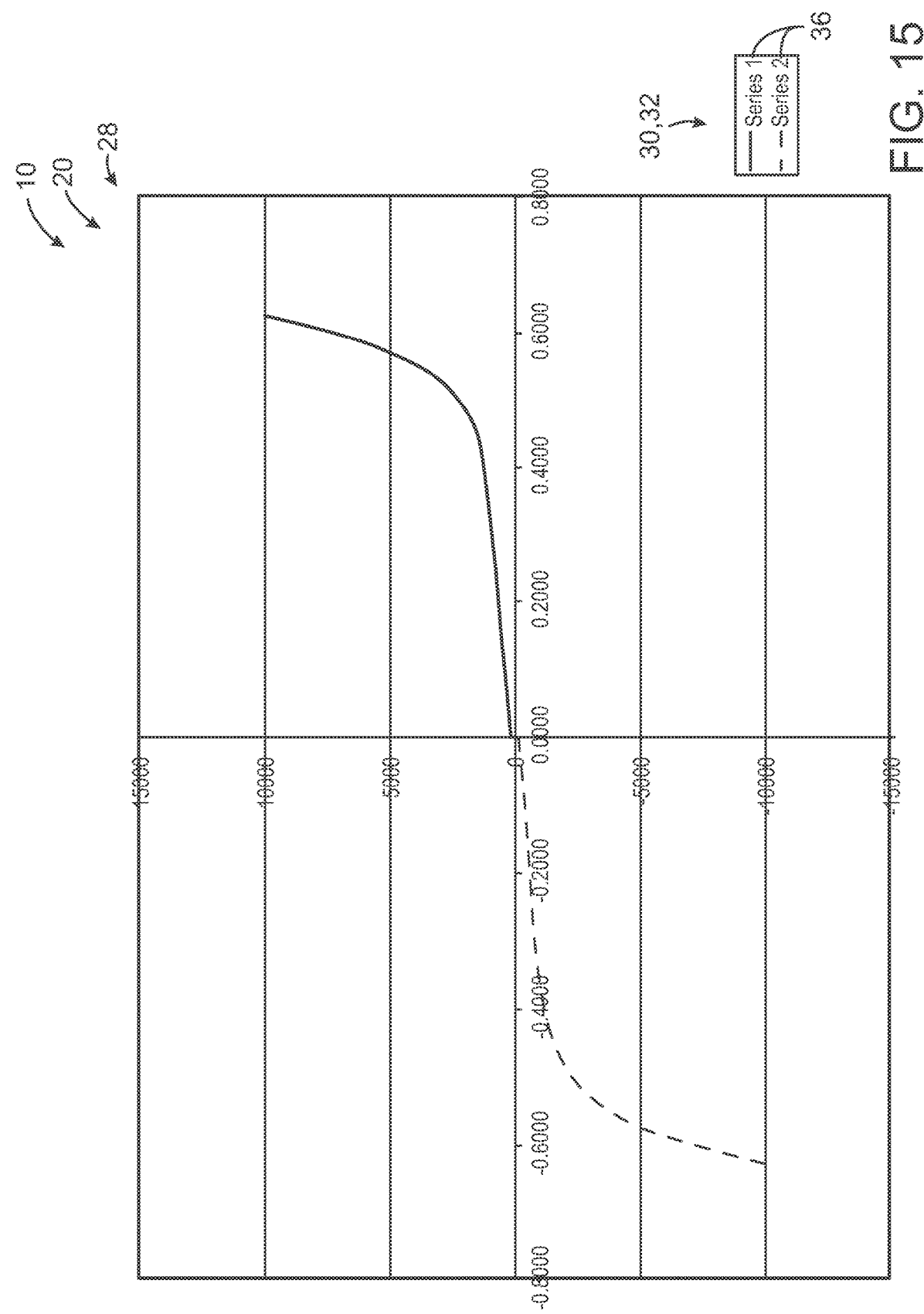
FIG. 15 shows a load-deflection line graph in inches deflected per pound of a bayonet style shock absorber made from microcellular urethane without a preload.
Figure 16:
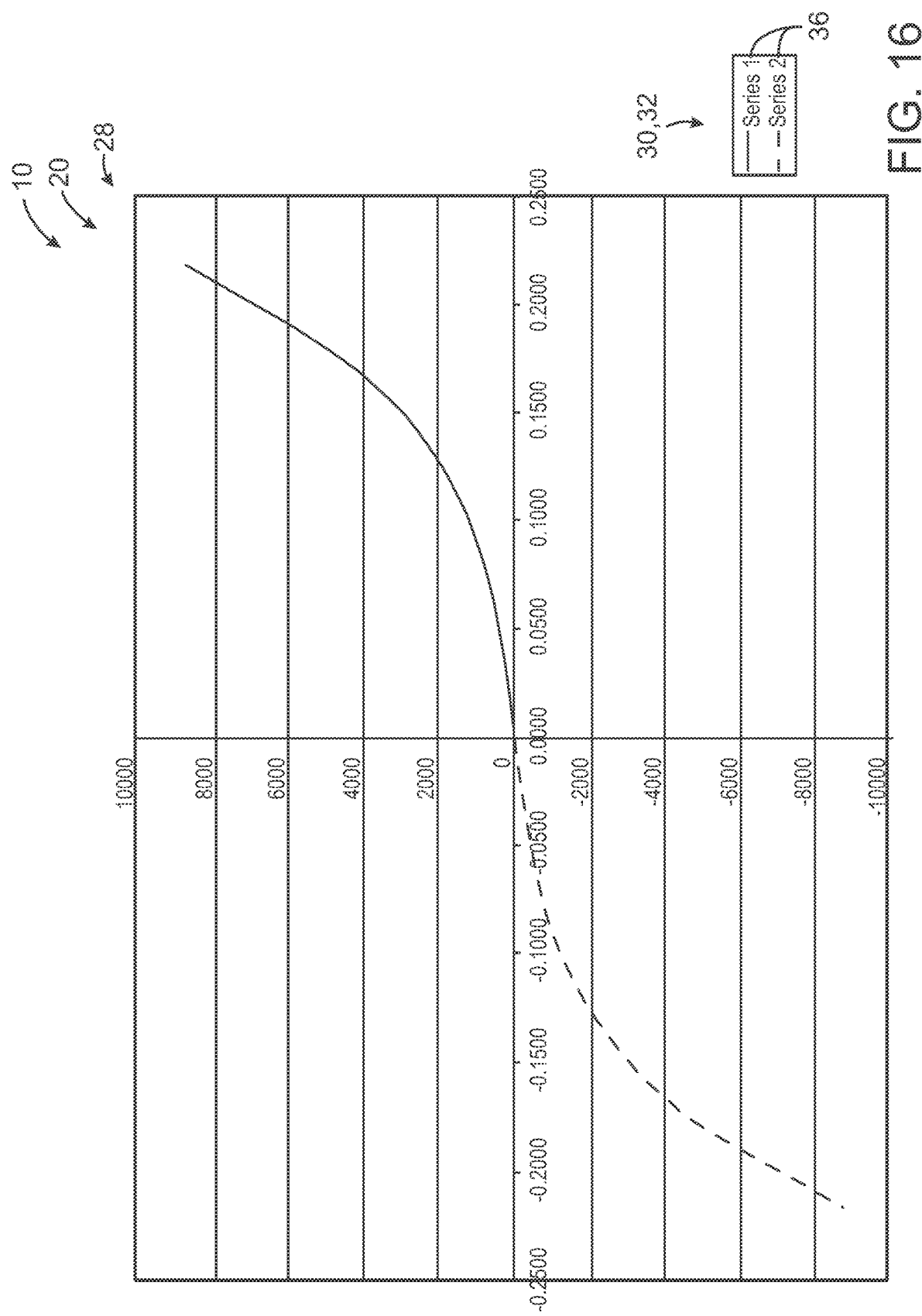
FIG. 16 shows a load-deflection line graph in inches deflected per pound of a bayonet style shock absorber made from microcellular urethane with a preload of 0.410 inches compressed via 1216 pounds.

Referring now to the examples shown in FIGS. 14-16, the method that can be used to assess weight and action that vibration isolating elements 28 of modular vibration isolation assembly 20 are trying to support can be first assessed essentially at 1G. Then the designer may look at the weight and action needed to support when the system is under load, where that load can be defined by measured or estimated operating parameters for the system (using accelerometers for example) over a sea state condition or over off-road terrain, etc. So, for off-road terrain one can look at the performance of various microcellular urethane bayonet style 36 vibration isolating elements 28 over 5G's vertical, 5G's lateral and longitudinal to simulate rock strikes and sliding down a hill and hitting something. From there, you can calculate the load-deflection curve for a piece of urethane. One can use rubber, but the material is inferior in terms of internal damping and hysteresis (see FIG. 14), so it is possibly recommended to use microcellular urethane.

Referring specifically to FIG. 14, the mounting of the bayonet for the shock absorber was tested in anticipation of higher than typical damping loads for the vehicle application. In order to gauge the potential headroom for added damping load, and to estimate the current reliability, a cyclic compression test from 2,000-20,000 lbs., run at 1.2 Hz, was devised using the steel washers as currently implemented to capture the mount. Two types were tested, a current sample believed to be natural rubber and a microcellular urethane (MCU) part which is proposed. The MCU part passed the 100,000 cycles test and during testing achieved a peak temperature of 35° C. during the test. The unit lost 6% of its original height (1.7 mm of set) after 100K cycles. The resultant energy loss was approximately 10%. The current sample was also tested, and failed at 9,000 cycles, after running at a temperature of 70° C., much of this temperature was the result of the inherent internal hysteresis of the material. The part bulged so much that the sides of the part rubbed the steel washers, causing abrasion, additional mechanical hysteresis, and wear. Automotive industry standard for acceptance is typically 30% energy loss and 10% compression set. The MCU part was well within the accepted industry standard. MCU offers several advantages over rubber components: MCU has less compression set; MCU has reduced transmissibility and steel weldments have shown to be more durable with MCU mounts over natural rubber parts; MCU has a higher temperature rating than natural rubber; The durability of the MCU parts themselves typically is better than rubber parts; MCU is compatible with all oils and solvents and cleaning agents; In max travel situations, the MCU will have more travel than a comparable rubber part, so the load peaks should be reduced as compared to a rubber part. Said another way, MCU has lower transmissibility for the same stroke.

In conclusion, in separate component testing and based on previous applications, it was found that dynamically the MCU part will increase its stiffness by 10-15% in high frequency applications. This would allow the part to be made in the same thickness and dimension as the original part. However, in the interest of insuring durability, production parts will be 0.075" (approximately 2 mm) longer, resulting in 4 mm longer stackup for an assembly, all of this additional stackup being pre-compression. This would have no effect on the assembly, or ease of assembly, of the units on the vehicle. For production, the parts will be molded, however there are no ill effects of using a machined MCU mount. As a result, it is recommended for the higher loads that are likely to be implemented now and in the future for vehicles with bayonet style shock absorber mounts, MCU is the logical choice. Natural rubber parts are not going to be durable enough to handle these higher loads.

As an example, with a load of 2,000 lbs., to support it with 4 vibration isolating elements 28, then one can see the deflection for each vibration isolating element. The positive and negative G's can be examined, so the system can be preloaded or pretensioned (like with fasteners 34) so the system goes over a rise and the system goes into negative G's, it is always dampened and never free floats. As a result, the system can provide damping in the upward direction and/or the downward direction. This can be determined through analysis of the terrain and the application, and the disclosed design enables the system to vary the preload with the preload torque of the bolts (fasteners 34) and one can put sleeves (see FIG. 3) of varying height in the center of the vibration isolating elements 28 to limit the maximum travel, or to prevent the setup from bottoming or topping out. FIGS. 15-16 show different load-deflection and spring rate graphs for various microcellular urethane bayonet style 36 under no preload (FIG. 15) and under preload or pretension (FIG. 16).

The key components to modular integration kit 10 for positioning system 12 may be configurable foundation plate 14, which is the horizontal components that span the turret ring, and adapter rings 46 which adapt the various rings and bolt patterns as required. From configurable foundation plate 14, modular vibration isolation assembly 20 with vibration isolation elements 28 may be located here, and can be enlarged if, and as needed, to accommodate heavier payloads (for example, a dual or triple rocket pod arrangement). If not used or needed, the vibration isolating elements 28 of modular vibration isolation assembly 20 may be removed and simply replaced with a rigid-bolting structure or assembly (no longer dampened bolting structure 15). Additional key components may be pedestal assembly 68 which then attaches to vibration isolating elements of modular vibration isolation assembly 20 through dampened bolting structure 16, actuator assembly 82, which can be an electrical, a pneumatic, a hydraulic, or an electro-hydraulic actuator 96 (shown in the Figures) operated with a hand-held controller. This embodiment also may include G-meter 56 or G-load- or shock-indicating device 58. This feature may be an electronic or mechanical device 64, which by nature of its design, contains indicator elements 66 which indicate outwardly for the users whether the payload or system was subjected to shock loading in excess of certain limits or amounts. The placement of this indicator or meter on the pedestal "above" the vibration isolation interface may provide a most accurate indication of the loadings that have been experienced by the payload. As shown in the Figures, in select embodiments G-meter 56 may be an electronic unit, which can also be a recorder if so desired. However, the disclosure is not so limited, and G-meter 56 could just as easily be one of those standard glass units you see on shipping containers that break when the crate was subject to a shock on the vibration isolated elements 28.

In sum, the disclosed modular integration kit 10 for positioning system 12 may include pieces that are the outer arches that adapt the central configurable foundation plate 14 to different or various turret rings, or the like. Modular integration kit 10 for positioning system 12 may be designed for turrets on wheeled and tracked vehicles, on boats and other marine vessels small and large and also on aircraft, though typically on aircraft the bearings are small and do not permit a user to stand inside (like in WWII bombers). Typically, these units on aircraft are operated by remote bearing positioning systems, but modular integration kit 10 for positioning system 12 may work the same—adapt the outer "rings" of the invention to configurable foundation plate 14 and the central section of modular vibration isolation assembly 20 and dampened bolting structure 16 and so on stays common.

As an example, and clearly not limited thereto, modular integration kit 10 for positioning system 12 may be used for rockets, like Fletcher. Rockets can incur damage under a certain amount of G-loads or G-shocks, and so including the vibration isolation via modular vibration isolation assembly 20 may be critical.

As shown in the Figures, modular integration kit 10 for positioning system 12 may be configured for three different turret rings using almost all of the same stuff, just by changing the outer "rings" to adapt to the different turret diameters, different hardware, and so on.

The disclosed modular integration kit 10 for positioning system 12 may be used or configured for cars/trucks/tracked ground vehicles and also to boats, aircraft, and/or the like.

In another aspect, the instant disclosure embraces a method to vibration isolate a sensitive payload in a rotating environment with a variety of structural fixing points. In general, this disclosed method may include utilizing the disclosed modular integration kit 10 for positioning system 12 in any of the various embodiments shown and/or described herein.

In yet another aspect, the instant disclosure embraces a method for measuring and monitoring and providing a warning or a "good to go" sign for a user for a sensitive payload, monitoring on the "isolated" side of the vibration isolators. In general, this disclosed method may include utilizing the disclosed modular integration kit 10 for positioning system 12 in any of the various embodiments shown and/or described herein, including with G-meter 56.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A modular integration kit for a positioning system comprising:
    a configurable foundation plate configured to attach to the positioning system;
    a dampened bolting structure affixed to said configurable foundation plate, the dampened bolting structure is configured to attach a payload to the positioning system;
    a modular vibration isolation assembly arranged between the configurable foundation plate and the dampened bolting structure, the modular vibration isolation assembly is configured to dampen the dampened bolting structure from movements of the configurable foundation plate attached to the positioning system;
    wherein the configurable foundation plate is configured to be attached to a turret ring, where the configurable foundation plate has a length configured to horizontally span the turret ring;
    wherein the configurable foundation plate includes:
        adapter rings on both ends, the adapter rings including adapter bolt hole patterns configured to adapt to various sizes and turret bolt hole patterns of the turret ring; and
        a manual link affixed to the configurable foundation plate, the manual link is configured to provide a means for manually moving the configurable foundation plate.

2. The modular integration kit for a positioning system of claim 1, wherein the modular vibration isolation assembly is configured to be sized to accommodate a weight and an action of the payload.

3. The modular integration kit for a positioning system of claim 2, wherein the modular vibration isolation assembly comprising:
    at least one vibration isolation element positioned at least partially between the configurable foundation plate and the dampened bolting structure;
    each of the at least one vibration isolation elements including:
        a bottom bayonet style shock absorber positioned between the configurable foundation plate and the dampened bolting structure;
        a top bayonet style shock absorber positioned between the dampened bolting structure and a washer; and
        a fastener connected between the washer and the configurable foundation plate, the fastener is configured to pretension the top bayonet style shock absorber and the bottom bayonet style shock absorber above and below the dampened bolting structure.

4. The modular integration kit for a positioning system of claim 3, wherein the bottom bayonet style shock absorber and the top bayonet style shock absorber are microcellular urethane bayonet style shock absorbers, wherein a type and a number of microcellular urethane style shock absorbers used in the modular vibration isolation assembly are set based on the weight and the action of the payload.

5. The modular integration kit for a positioning system of claim 1 further comprising a G-meter attached to the dampened bolting structure, the G-meter is configured to be a shock-indicating device for the payload configured to record tri-axis g-force levels as well as to compute resultant g-force loads.

6. The modular integration kit for a positioning system of claim 5, wherein the G-meter is an electronic or mechanical device with indicator elements which indicate outwardly for users whether the payload was subjected to shock loading in excess of certain limits or amounts.

7. The modular integration kit for a positioning system of claim 5, wherein the G-meter is affixed on the dampened bolting structure above the modular vibration isolation assembly, whereby the G-meter is configured to provide accurate indications of loadings that have been experienced by the payload.

8. The modular integration kit for a positioning system of claim 1, wherein the dampened bolting structure including:
a pedestal assembly;
a bellcrank assembly pivotally mounted to the pedestal assembly, the bellcrank assembly including quick release fasteners or pins configured for mounting the payload, where the payload is selected from a group consisting of: a rifle; an optic; a laser; and a rocket launcher; and
an actuator assembly configured to control angular movement of the bellcrank assembly about the pedestal assembly.

9. The modular integration kit for a positioning system of claim 8, wherein the actuator assembly including an actuator selected from a group consisting of: an electrical actuator; a pneumatic actuator; a hydraulic actuator; and an electro-hydraulic actuator operated with a hand-held controller.

10. The modular integration kit for a positioning system of claim 9, wherein the actuator is the electro-hydraulic actuator operated with the hand-held controller;
wherein an actuator control box is included, the actuator control box is configured for controlling the actuator, the actuator control box is affixed to an adapter ring of the configurable foundation plate.

11. The modular integration kit for a positioning system of claim 1 further comprising a foldable load spreader, the foldable load spreader is sized for a storage area of a vehicle, the foldable load spreader is configured to be folded and oriented in the vehicle for spreading or separating various loads, the foldable load spreader including two hinges configured with 270 degrees of ration, whereby, the foldable load spreader is configured to be folded into a flat shape, a z-shape, or a U-shape.

12. The modular integration kit for a positioning system of claim 1 further comprising a vibration isolating storage board, the vibration isolating storage board is configured to be mounted in a vehicle for storing and vibration isolating various loads on the vehicle, the vibration isolating storage board including a plurality of vibration isolators positioned underneath the vibration isolating storage board.

13. The modular integration kit for a positioning system of claim 1, wherein the modular integration kit is configured to be stored and shipped on a standard pallet for commercial shipping, where the configurable foundation plate with adapter rings, the dampened bolting structure, the modular vibration isolation assembly, a manual link, a pedestal assembly, and a bellcrank assembly can be disassembled and stored in a storage case, where the storage case can be secured on top of a vibration isolating storage board positioned on the standard pallet, and a foldable load spreader can be folded and positioned on the standard pallet beside the storage case.

14. The modular integration kit for a positioning system of claim 1, wherein the modular integration kit is configured for:
a variety of vehicles, vessels, and other crafts that require an integration kit for a positioning system to position the payload, thereby enabling a wide array of such variety of vehicles, vessels, and other crafts to be integrated with a high percentage of common parts;
a commonality of parts configured to reduce costs, enable economies of scale in the production of most components, and increase commonality and interoperability in certain environments, to enable spare parts to be shared across users of different systems, but which are largely common;
having the ability to be adapted to a plethora of turret configurations, vendors, and sizes with largely the same components, whereby many vehicles with different fitments of bearing systems or turrets pivoting around a central axis, or turret systems with bearings and a bore through which a user could stand to manually operate an optical system, where manufacturers of these various turret systems have different features and designs, as well as various sizes or diameters of the turret, and some turrets have motorized rotation while others have manual cranks to rotate them, can use the modular integration kit;
cars, trucks, tracked ground vehicles, boats, and aircrafts; or
combinations thereof.

15. A modular integration kit for a positioning system comprising:
a configurable foundation plate configured to attach to the positioning system;
a dampened bolting structure affixed to said configurable foundation plate, the dampened bolting structure is configured to attach a payload to the positioning system;
a modular vibration isolation assembly arranged between the configurable foundation plate and the dampened bolting structure, the modular vibration isolation assembly is configured to dampen the dampened bolting structure from movements of the configurable foundation plate attached to the positioning system;
a G-meter attached to the dampened bolting structure, the G-meter is configured to be a shock-indicating device for the payload configured to record tri-axis g-force levels as well as to compute resultant g-force loads;
wherein the G-meter is an electronic or mechanical device with indicator elements which indicate outwardly for users whether the payload was subjected to shock loading in excess of certain limits or amounts.

16. A modular integration kit for a positioning system comprising:
a configurable foundation plate configured to attach to the positioning system;
a dampened bolting structure affixed to said configurable foundation plate, the dampened bolting structure is configured to attach a payload to the positioning system;
a modular vibration isolation assembly arranged between the configurable foundation plate and the dampened bolting structure, the modular vibration isolation assembly is configured to dampen the dampened bolting structure from movements of the configurable foundation plate attached to the positioning system;
wherein the dampened bolting structure including:
a pedestal assembly;
a bellcrank assembly pivotally mounted to the pedestal assembly, the bellcrank assembly including quick release fasteners or pins configured for mounting the payload, where the payload is selected from a group consisting of: a rifle; an optic; a laser; and a rocket launcher; and an actuator assembly configured to control angular movement of the bellcrank assembly about the pedestal assembly;

wherein the actuator assembly including an actuator selected from a group consisting of: an electrical actuator; a pneumatic actuator; a hydraulic actuator; and an electro-hydraulic actuator operated with a hand-held controller.

* * * * *